United States Patent
Takahashi

(10) Patent No.: US 7,444,028 B2
(45) Date of Patent: Oct. 28, 2008

(54) IMAGE PROCESSING APPARATUS FOR BINARIZING IMAGE DATA

(75) Inventor: Osamu Takahashi, Aichi (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1204 days.

(21) Appl. No.: 10/770,461

(22) Filed: Feb. 4, 2004

(65) Prior Publication Data

US 2004/0218822 A1 Nov. 4, 2004

(30) Foreign Application Priority Data

Feb. 4, 2003 (JP) ............................ P2003-027551

(51) Int. Cl.
G06K 9/34 (2006.01)
H04N 1/40 (2006.01)
G06K 9/36 (2006.01)

(52) U.S. Cl. .................. 382/237; 358/1.9; 358/465

(58) Field of Classification Search ............... 382/147, 382/149, 151, 164, 172, 173, 181, 218, 219, 382/232, 233, 237, 305, 312; 358/448, 465, 358/504, 505, 515, 519, 521, 523, 525
See application file for complete search history.

(56) References Cited

U.S. PATENT DOCUMENTS

| 5,091,967 | A | * | 2/1992 | Ohsawa | 382/172 |
| 5,315,409 | A | * | 5/1994 | Matsumura et al. | 382/172 |
| 5,774,574 | A | * | 6/1998 | Hoki | 382/149 |
| 6,122,075 | A | * | 9/2000 | Yamada et al. | 358/446 |
| 6,259,809 | B1 | * | 7/2001 | Maruo | 382/151 |
| 6,597,805 | B1 | * | 7/2003 | Nagao | 382/145 |
| 6,766,055 | B2 | * | 7/2004 | Matsugu et al. | 382/173 |
| 7,062,099 | B2 | * | 6/2006 | Li et al. | 382/237 |

FOREIGN PATENT DOCUMENTS

| JP | 05-308460 | 11/1993 |
| JP | 06-169373 | 6/1994 |
| JP | 7-105856 | 11/1995 |

* cited by examiner

Primary Examiner—Amir Alavi
(74) Attorney, Agent, or Firm—Oliff & Berridge, PLC

(57) ABSTRACT

An original of copying, fax, or the like is read by a CCD image sensor and resulting image data are input to a data abnormality detecting section via an A/D converter and correcting unit. A maximum value and a minimum value of the pieces of gradation information of the image data are detected and compared with a black determination value and a white determination value, respectively, whereby whether the original is all white or all black is detected and an data abnormality announcing section issues an alarm message or the like. The data abnormality detection is performed before a binarizing section binarizes the image data.

35 Claims, 14 Drawing Sheets

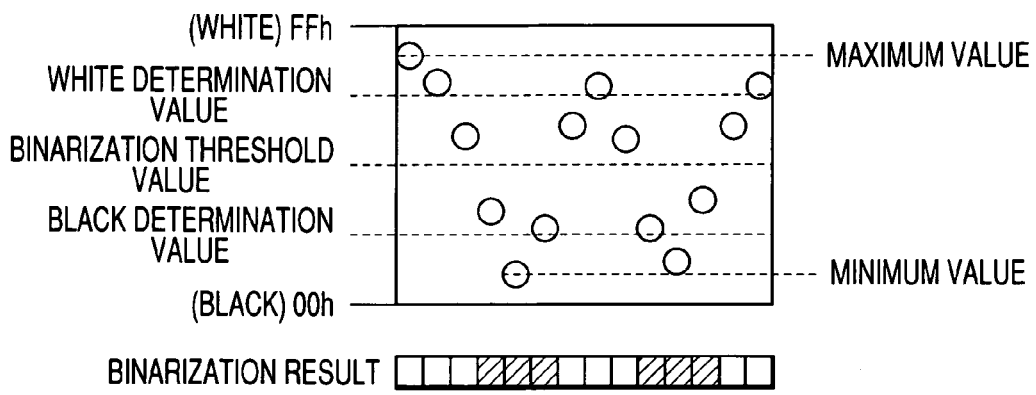
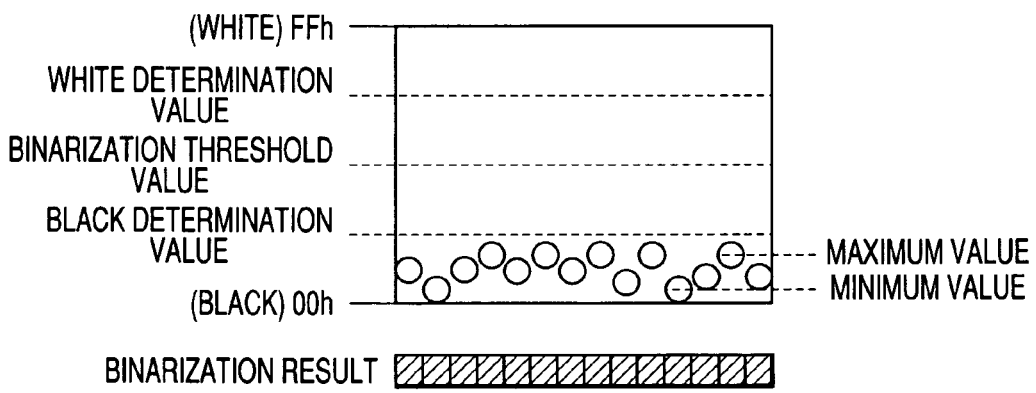
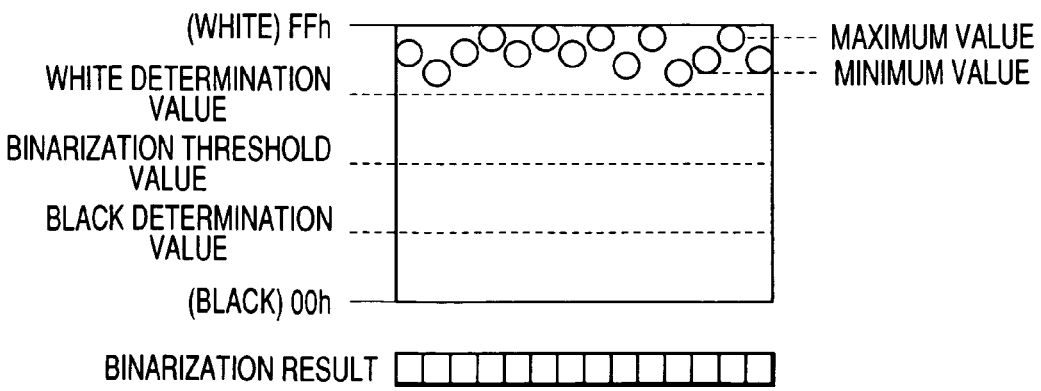

FIG. 17
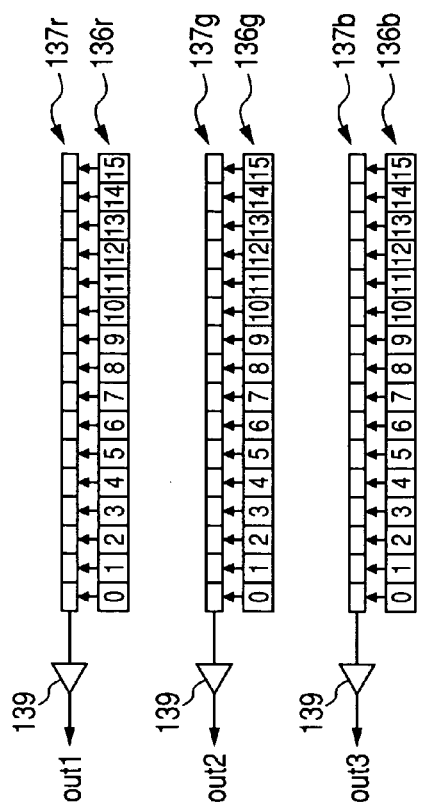
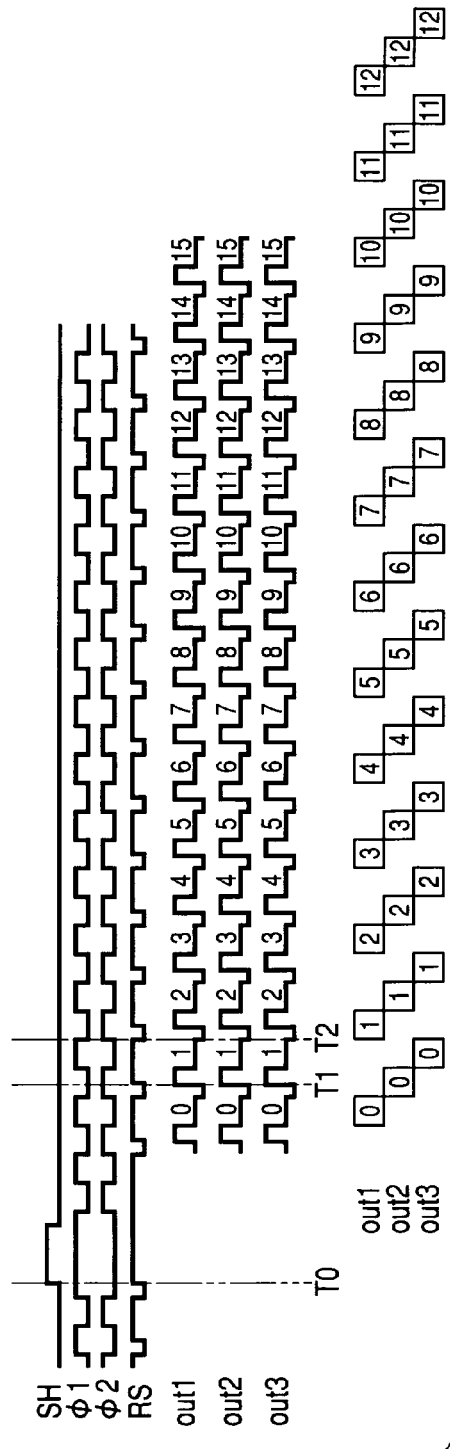

IMAGE PROCESSING APPARATUS FOR BINARIZING IMAGE DATA

BACKGROUND OF THE INVENTION

1. Field of the Invention

The present invention relates to an image processing apparatus for binarizing image data input to the apparatus.

2. Description of the Related Art

In an image scanning apparatus provided in a conventional apparatus such as facsimile machine (hereinafter simply referred to as fax machine) and copy machine, when image data are generated by scanning and digitizing an image consisting of texts and graphics on an original, the image data are subjected to an abnormality determination. In the abnormality determination, whether the image data are usable data is determined by determining whether the digitized image data are all-white data or all-black data.

Usually, the scanning (reading) of an original is performed by a CCD (charge coupled device) image sensor or a CIS (contact image sensor) and resulting image data are a set of data (hereinafter referred to as "pixel data") representing pieces of gradation information (i.e., pieces of numerical information representing gradations, that is, luminance levels) of an original for respective pixels. The abnormality determination on image data produced by reading is performed on the pieces of gradation information of the respective pixel data. For example, in JP-B-7-105856, whether image data are all-white data or all-black data is determined by converting the gradation information of each pixel data into 1-bit data indicating white or black by using a threshold value (what is called binarization) and determining a ratio between the number of white data and the number of black data.

However, determining whether image data are all-white data or all-black data after binarizing the pixel data using a threshold value has the following problem. For example, where a text and graphics are written or drawn on a gray sheet, if pieces of gradation information corresponding to the ground of an original and a text and graphics on the original are converted into black pixels by using a threshold value, the original is determined all black.

Further, depending on the binarization method, a halftone such as gray may be converted into black pixels and white pixels on a pixel data basis randomly or according to a prescribed calculation method. For example, where no text or the like is formed en a gray sheet, image data of such an original may be determined a mixture of white data and black data, in which case the original read is hardly determined abnormal.

SUMMARY OF THE INVENTION

The present invention has been made to solve the above problems, and an object of the invention is therefore to provide ant image processing apparatus capable of properly performing an abnormality determination on an original irrespective of gradation information corresponding to the ground of an original.

In order to achieve the object, according to one aspect of the invention, there is provided an image processing apparatus including: an input section configured to be input image data having gradation information of at least 2-bits per pixel; a detecting section configured to detect an abnormality in the gradation information of the image data input to the input section; an announcing section configured to announce the detection of the abnormality in a case where the abnormality is detected by the detecting section; a binarizing section configured to binarize the gradation information of the image data into 1-bit per pixel; and an output section configured to output the image data binarized by the binarizing section.

BRIEF DESCRIPTION OF THE DRAWINGS

These and other objects and advantages of the present invention will become more fully apparent from the following detailed description taken with the accompanying drawings, in which:

FIG. 9 shows examples of a minimum value and a maximum value of pieces of gradation information that are obtained by reading an original and in which the gradations of pixel data are scattered moderately;

FIG. 10 shows examples of a minimum value and a maximum value of pieces of gradation information that are obtained by reading an original and in which most of the gradations of pixel data are black;

FIG. 11 shows examples of a minimum value and a maximum value of pieces of gradation information that are obtained by reading an original and in which most of the gradations of pixel data are white;

FIG. 17 is a timing chart illustrating the operation timing of a CCD image sensor as an exemplary 3-line/3-output device.

DETAILED DESCRIPTION OF THE PREFERRED EMBODIMENTS

Referring now to the accompanying drawings, a description will be given in detail of a preferred embodiment of the invention. Hereinafter, a multifunction machine incorporating an image processing apparatus according to an embodiment of the invention will be described with reference to the drawings.

Hereinafter, an entire configuration of the multifunction machine 10 will be described with reference to FIGS. 1 through 4.

Figure 1:
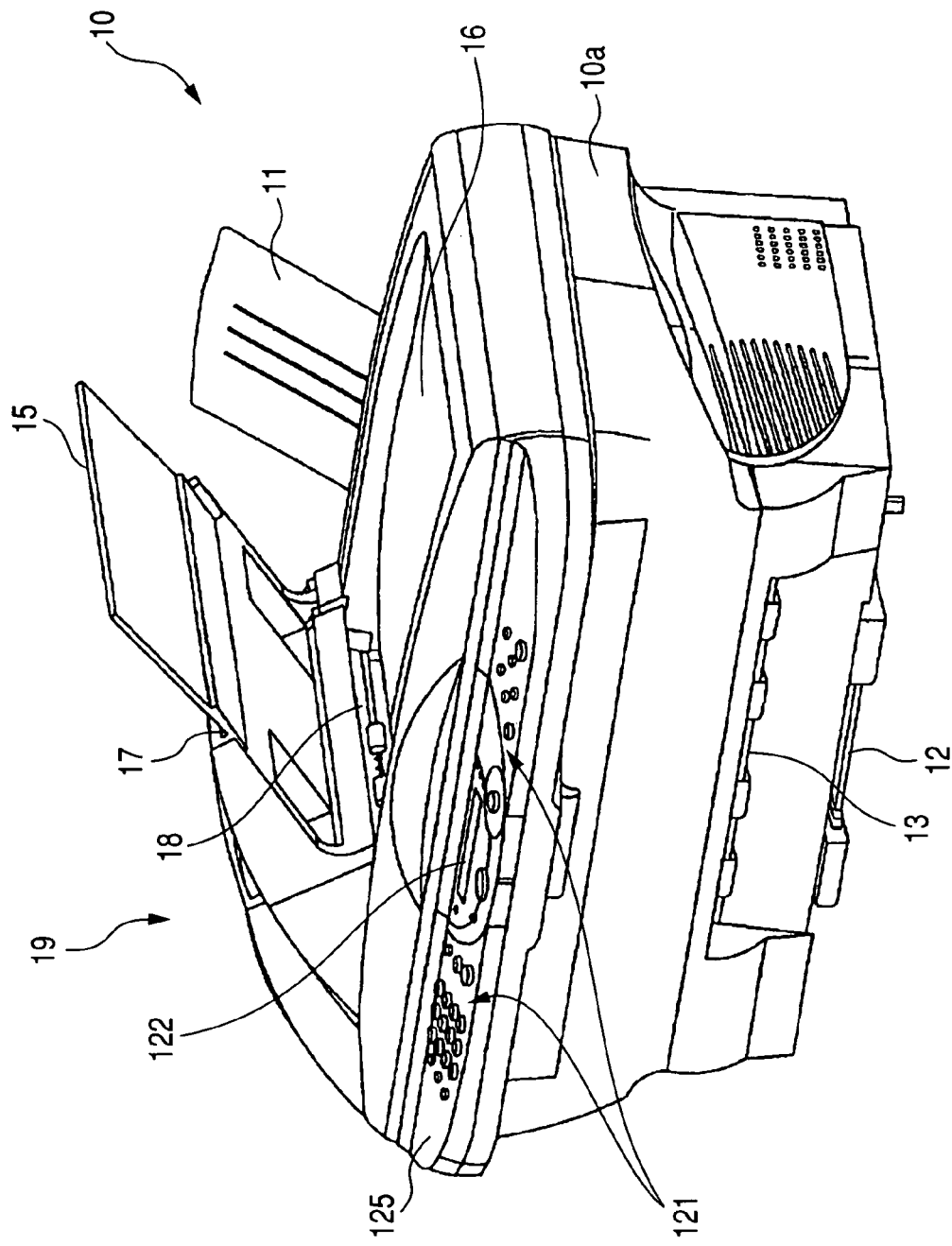
FIG. 1 is a perspective view showing an exterior appearance of a function machine according to the present invention.

A multifunction machine 10 according to the embodiment shown in FIG. 1 has a case 10 that generally assumes a rectangular parallelepiped that is long in the right-left direction and is provided with a fax communication capability having wired connection to a public communication network of a communication line company via a telephone line and capable of sending and receiving image data obtained by digitizing an image consisting of texts and graphics, an image reading capability of reading an image on an original optically and converting it into digital data, and an image forming capability of forming an image on an recording medium by jetting inks on the basis of image data. The multifunction machine 10 is also provided a with an image copying is capability of forming, on a recording medium, with the image forming capability, an image of an original that is read with the image reading capability. The image forming capability and the fax communication capability are provided inside the case 10a of the multifunction machine 10 and the image reading capability is provided on top of the case 10a.

The multifunction machine 10 is provided with a sheet supply tray 11 for supplying a sheet as a recording medium to the inside of the case 10a through a sheet inlet (not shown) that is formed on the back side of the case 10a and a sheet ejection tray 12 for stack-holding image-formed sheets that are ejected through a sheet outlet 13 that is formed on the front side of the case 10a. A sheet on which printing is performed is transported in the front-rear direction of the case 10a. In FIG. 1, the sheet ejection tray 12 is retracted to the bottom of the case 10a. When used, the sheet ejection tray 12 is pulled out to the front side.

An operating panel 125 is provided at a top-front position of the case 10a so as to extend in the longitudinal direction of the case 10a. An operating section 121 consisting of switches and keys with which a user is to key-input an instruction to the multifunction machine 10 and a display section 122 such as a liquid crystal display for displaying a message to a user during manipulation or at the occurrence of an error are provided on the top surface of the operating panel 125. The display section 122 functions as an announcing unit of the invention.

When the top portion including the operating panel 125 of the multifunction machine 10 is swung up with the support axis located on the backside (i.e., the front portion of the case 10a is lifted), the inside of the case 10a appears. There is provided a glass plate (not shown) that is oriented generally horizontally and covers the inside of the case 10a from above is fixed to the case 10a. A line CCD image sensor 135 (see FIG. 3) for reading the image of an original placed on the glass plate with photodiodes 136 (see FIG. 3) and converting it into digital data is disposed under the glass plate. Being what is called an FB (flat bed) type scanner, the CCD image sensor 135 scans an original placed on the glass plate while being moved in the right-left direction (i.e., auxiliary scanning direction) under the glass plate. The front-rear direction (i.e., main scanning direction) of the case 10a is the line direction in which the photodiodes 136 are arranged.

An ADF (automatic document feeder) 19 is provided at the top of the multifunction machine 10. The ADF 19 has a supply tray 15 on which sheets of an original are stacked so as to be pulled into the machine 10 one by one through a supply inlet 17 and placed on the glass plate to enable its reading after passing over the CCD image sensor 135 that is located under the left end of the glass plate. The ADF 19 also has an ejection tray 16 for stack-holding sheets of an original that are ejected through an ejection outlet 18 after being read. Each sheet of the original goes from the supply inlet 17 toward the left end of the glass plate, U-turns over the CCD image sensor 135, and then goes along a transport path toward the ejection outlet 18. That is, the right-left direction of the case 10a is the original transport direction.

Figure 2:
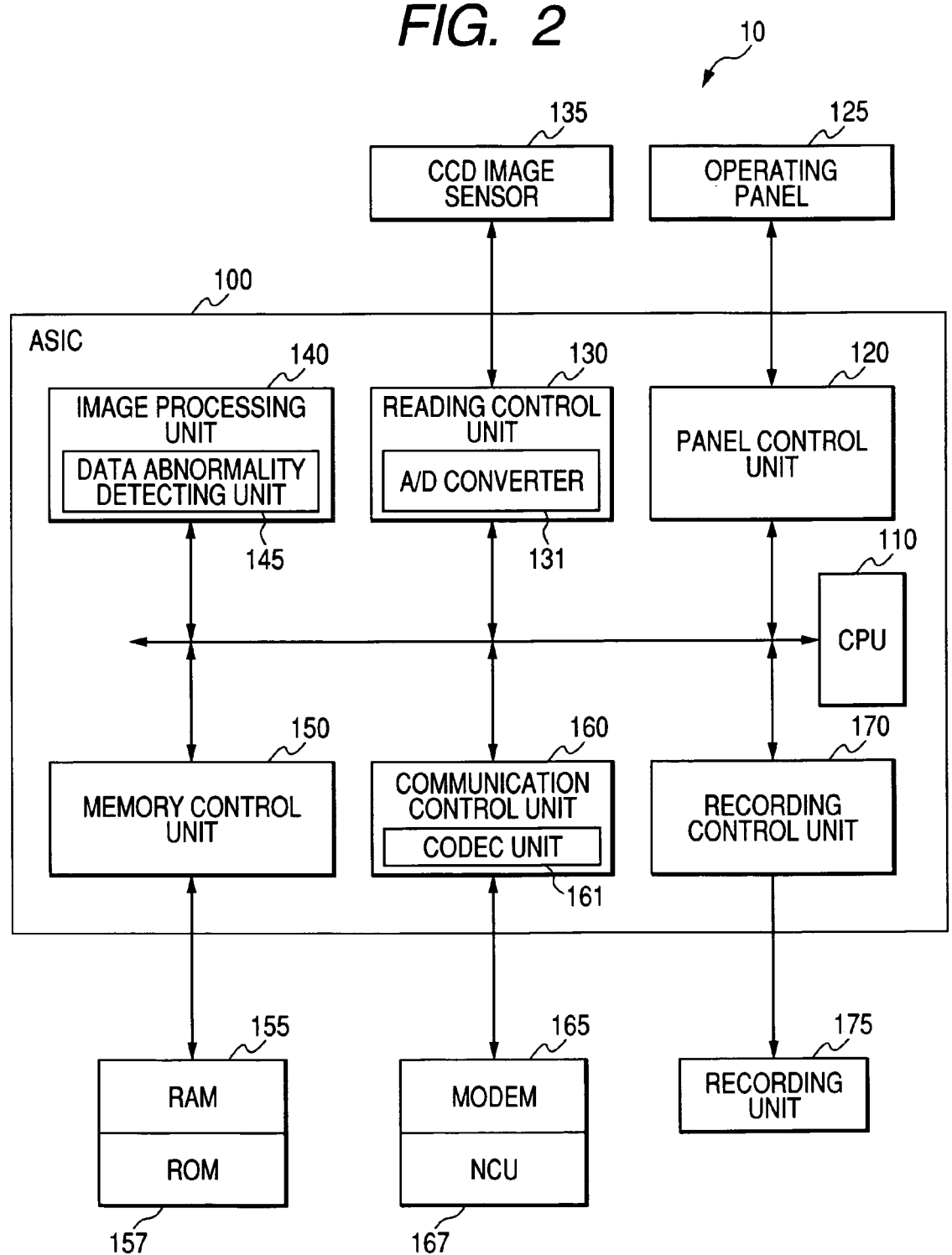
FIG. 2 is a block diagram showing an electrical configuration of the function machine.

As shown in FIG. 2, the multifunction machine 10 is equipped with and controlled by an ASIC (application-specific integrated circuit) 100. The ASIC 100 incorporates a CPU 110, a panel control unit 120, a reading control unit 130, an image processing unit 140, a memory control unit 150, a communication control unit 160, and a recording control unit 170. The CPU 110 and the reading control unit 130 may be provided outside the ASIC 100.

The CPU 110 controls the ASIC 100. The panel control unit 120 detects an input from the operating section 121 of the operating panel 125 and sends it to the CPU 110. Further, receiving an instruction from the CPU 110, the panel control unit 120 controls display on the display section 122. The reading control unit 130 controls the movement of the CCD image sensor 135 in the auxiliary scanning direction and the driving of an original transport motor (not shown) that is provided in the ADF 19 and performs other controls. The reading control unit 130 incorporates an A/D converter 131 for converting an analog signal received from the CCD image sensor 135 into digital data.

Figure 3:
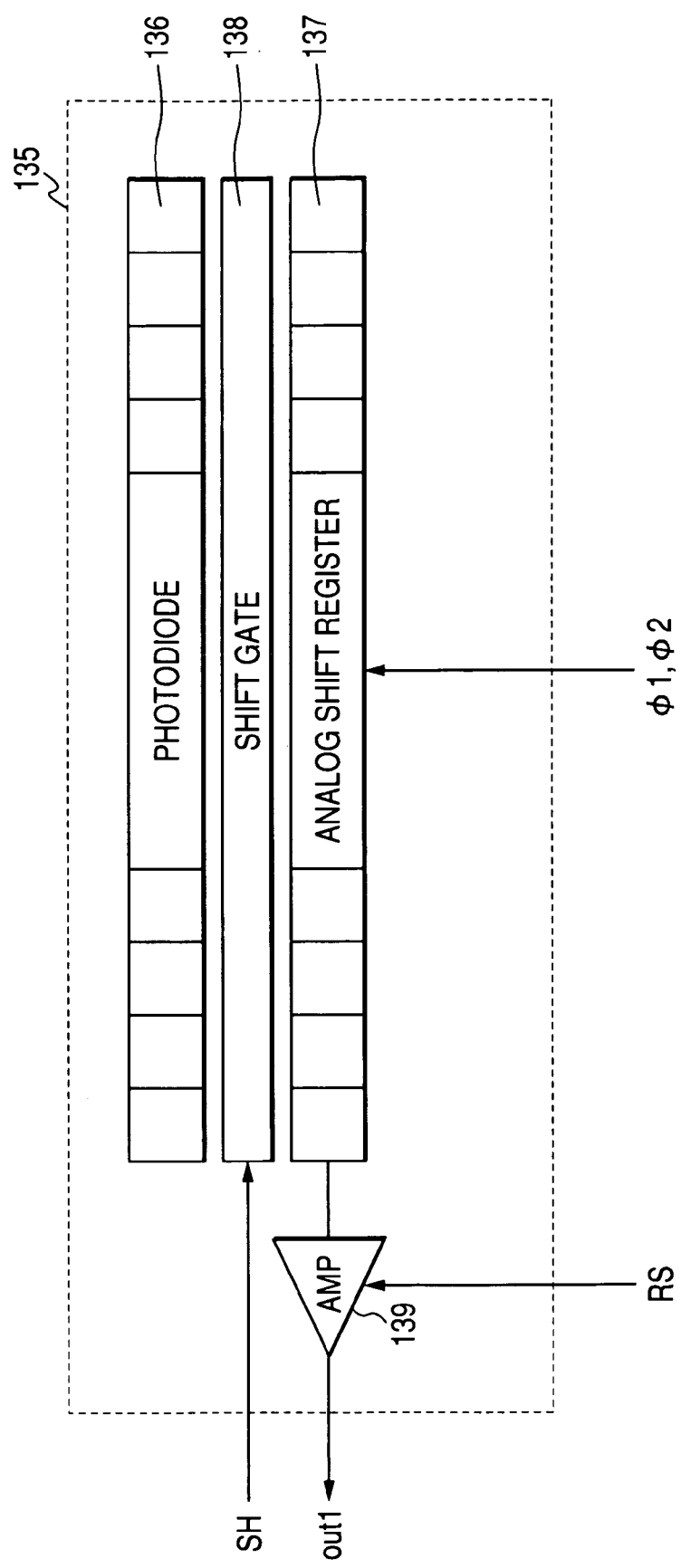
FIG. 3 is a block diagram showing the configuration of a one-line/one-output CCD image sensor.

A supplemental description will be made of the CCD image sensor 135 below with reference to FIG. 3. As described above, the CCD image sensor 135 is a line CCD image sensor in which the photodiodes 136 are arranged in line. An original is illuminated with strong light emitted from a light source and reflection lights is received by the individual photodiodes 136, whereby a light intensity (i.e., lightness) distribution of the reflection light is converted into an electrical signal. Optical energy incident on each photodiode 136 is photoelectrically converted and stored as a charge. Since approximately one electron is generated in response to one photon, the amount of charge depends on the light quantity.

An analog shift register 137 having a corresponding input is annexed to each of the photodiodes 136 that are arranged in line. When a shift gate 138 that is interposed between the photodiodes 136 and the analog shift registers 137 is opened in response to a shift pulse SH, the analog shift registers 137 receive charges from the photodiodes 36, respectively, in parallel. In the analog shift registers 137, parallel-to-serial conversion is effected in such a manner that the charges are shifted by one pitch every time one of clock pulses j1 and j2 that are separated from each other by one cycle and are output to an amplifier 139 in order of the arrangement of the photodiodes 136. The amplifier 139 converts differences in the amounts of charge into voltage differences, which are output from the CCD image sensor 135 as an output signal out1 in synchronism with a reset pulse RS that is input to the amplifier 139. In this manner, image data as an analog electrical signal are output. That is, pixel data of image data are output from the CCD image sensor 135 in order of lines of an original read and, for each line, in order of the arrangement of the photodiodes 136. Thousands of photodiodes 136 are arranged on the line of the CCD image sensor 135.

Image data that are transmitted as an analog electrical signal are converted into digital data of 8 bits, for example, by the A/D converter 131 of the reading control unit 130 in accordance with the magnitudes of signal voltages, whereby a lightness distribution of light received by the photodiodes 136 can be expressed in 256 gradations.

A color original can be read by the CCD image sensor 135 by switching between three filters of the three primary colors of light, that is, R (red), G (green), and B (blue), in such a manner that lightness distributions on the same line of the original are read through the respective filters. An alternative method is such that a light source emitting white light or green light is used and a prism or the like for color separation is disposed on the optical path instead of the filters. Reflection light from an original to be read is separated into three beams of R, G, and B, which are read individually. As a further alternative, lightness distributions of A, G, and B on the same line are read simultaneously by three CCD image sensors that are covered with R, G, and B filters, respectively. A CIS may be used in place of the CCD image sensor 135. In general, the CIS used together with LEDs or the like of R, G, and B as light sources. The CIS provides an advantage that it is smaller in power consumption, smaller in size, and lighter than the CCD image sensor with which a single light source such as a fluorescent lamp is used. On the other hand, the CIS has a disadvantage that the depth of field is shallow. The CCD image sensor 135 or the CIS functions as an image scanning unit of the invention.

As shown in FIG. 2, the image processing unit 140 performs various kinds of processing on image data obtained by reading an original and supplied from the reading control unit 130 or image data to be printed by a recording unit 175. The image processing unit 140 incorporates a data abnormality detecting section 145 for detecting an abnormality in data that are input from the reading control unit 130. The memory control unit 150 adjusts the timing of a data transfer between the ASIC 100 and a RAM 155 or a ROM 157 each of which is connected to the ASIC 100.

Figure 4:
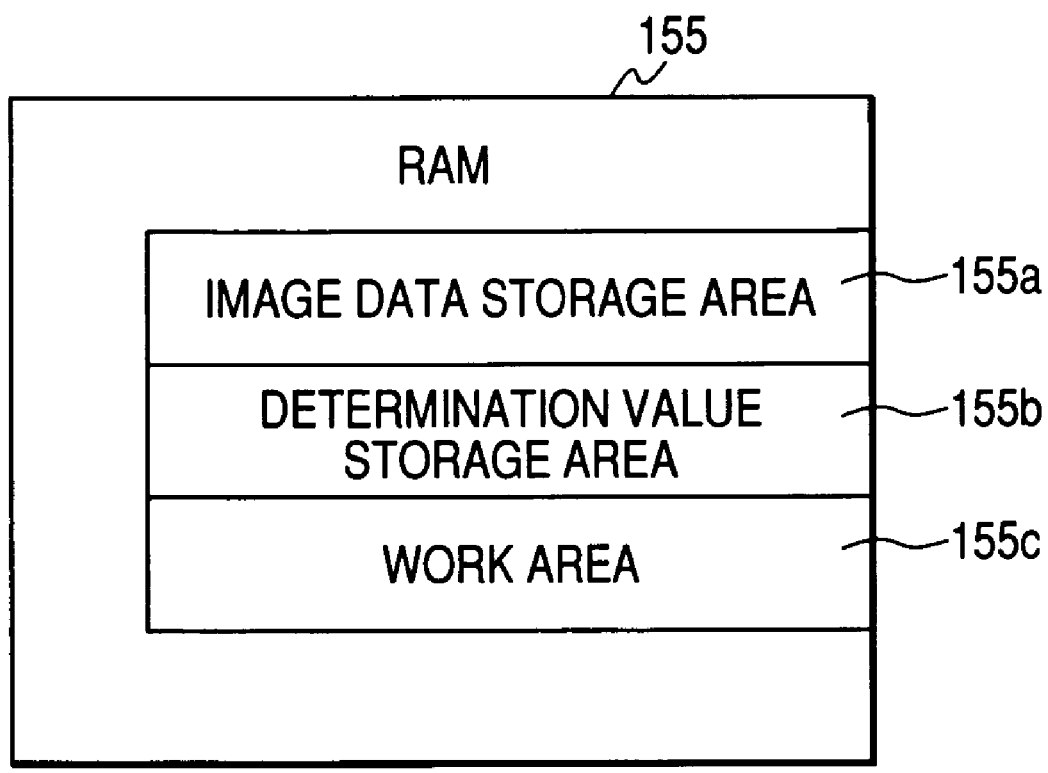
FIG. 4 is a conceptual diagram of storage areas of a RAM.

As shown in FIG. 4, a RAM 155 has an image data storage area 155a where to store image data temporarily, a determination value storage area 155b where to store determination values and threshold values used in abnormality determination processing (steps S16 and S25 in FIG. 8; described later) and a binarizing section 240 (see FIG. 7; described later), and a work area 155c where to store data such as flag that are used, for example, during execution of a data abnormality detecting program (described later) or processing of the CPU 110.

As shown in FIG. 2, in performing a fax communication via an NCU (network control unit) 167 that is connected to a public communication network which is analog lines, the communication control unit 160 controls a modem 165 that D/A-converts (modulates) fax data that have been processed internally as a digital signal into an analog signal and A/D-converts (demodulates) fax data of a received analog signal into a digital signal. The communication control unit 160 incorporates a codec unit 161 that compresses (encodes) data to send bitmap image data, (i.e., uncompressed image data) in the form of fax data and decompresses (decodes) received fax data into image data. The modem 165 functions as a data sending section and as a data receiving section of the invention.

The codec unit 161 compresses image data to reduce the amount of data in a fax communication. Image data of a fax communication are such that each pixel is expressed in two gradations, that is, it is white or black. For example, data "11110100" representing "white, white, white, white, black, white, black, black" is compressed (encoded) by the codec unit 161 into data that mean four 1's, "0," "1," and two 2's. The amount of data is reduced by performing this processing on the entire pixel data. The codec unit 161 also performs decompression for returning compressed image data into original uncompressed image data according to an opposite procedure to the above. The codec unit 161 functions as a data compressing section and as a data decompressing section of the invention.

The recording control unit 170 controls the recording unit 175 that prints image data. In this embodiment, ink jet recording type printing is performed. The recording control unit 170 controls the ink jetting timing and the reciprocation of a carriage (not shown) having a head (not shown) that jets out inks while being reciprocated perpendicularly to the transport direction (the back side to the front side of the case 10a (see, FIG. 1)) of a sheet, and also controls a transport motor (not shown) for transporting the sheet. The recording unit 175 and the recording control unit 170 for controlling it correspond to an image forming apparatus of the invention.

Although not shown in any drawings, a USB interface, for example, is connected to the ASIC 100. A personal computer or the like that is connected to the multifunction machine 10 via a USB cable can use such capabilities as the image forming capability, the image reading capability, and the fax communication capability.

Figure 5:
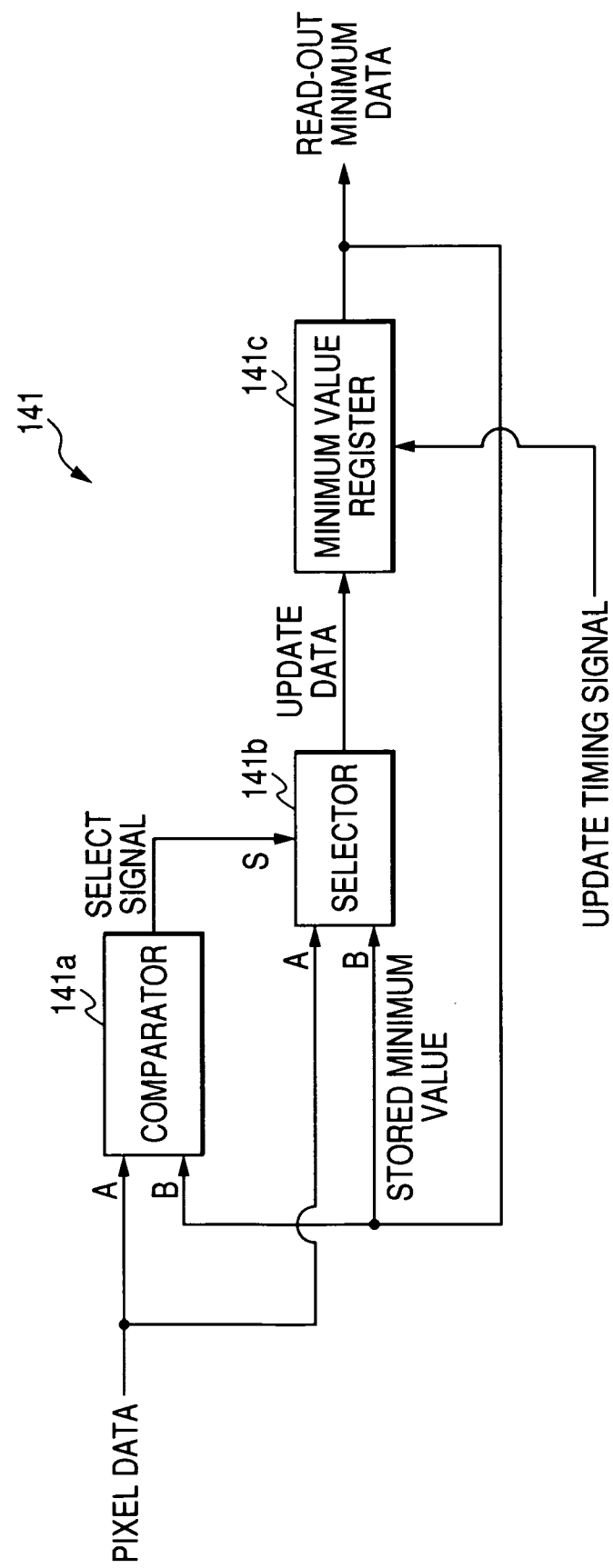
FIG. 5 is a block diagram showing the circuit configuration of a minimum value detector.

Next, the configurations of a minimum value detector 141 and a maximum value detector 142 that are provided in the data abnormality detecting section 145 of the image processing unit 140 will be described with reference to FIGS. 5 and 6. The data abnormality detecting section 145 detects an abnormality in an original by detecting a data abnormality by checking each pixel data of image data that are obtained by reading the original with the CCD image sensor 135. As shown in FIG. 5, the minimum value detector 141 is composed of a comparator 141a for comparing the magnitudes of input data and outputting a comparison result as a select signal, a selector 141b for outputting one of two input data on the basis of the select signal that is output from the comparator 141a, and a minimum value register 141c for storing the data that is output from the selector 141b.

Each pixel data (i.e., input A) that is obtained by reading an original with the CCD image sensor 135 and supplied from the reading control unit 130 and an output (i.e., input B) of the minimum value register 141c are input to the comparator 141a. The comparator 141a compares the two inputs A and B, and outputs, as a select signal (i.e., output S), "0," for example, if the input A is smaller than the input B and outputs "1," for example, if the input A is greater than or equal to the input B. The comparator 141a functions as a minimum value detecting and comparing unit of the invention.

The same data as input to the comparator 141a, that is, the inputs A and B, and the select signal that is output from the comparator 141a are input to the selector 141b. The selector 141b outputs one of the inputs A and B as update data in accordance with the select signal. For example, if the input A is smaller than the input B, the comparator 141a outputs "0" as a select signal. The selector 11b allows the input A to pass through itself on the basis of the select signal "0." Conversely, if receiving a select signal "1," the selector outputs the input B as update data.

The update data that is output from the selector 141b and an update timing signal that is input externally are input to the minimum value register 141c. The update timing signal is transmitted approximately in synchronism with input of the pixel data of the original to the comparator 141a. The minimum value register 141c replaces the storage value with the update data when receiving the update data, and outputs the storage data upon reception of the update timing signal. The minimum value register 141c functions as a minimum value storing unit of the invention.

Figure 6:
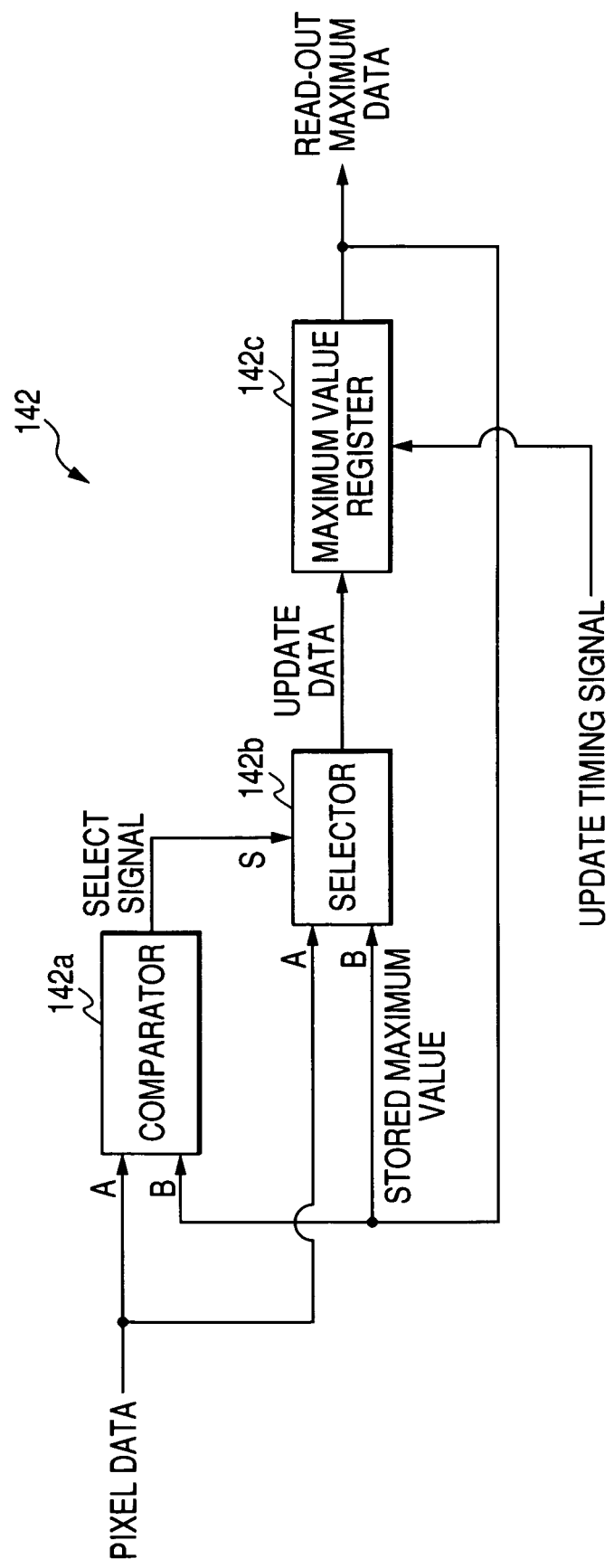
FIG. 6 is a block diagram showing the circuit configuration of a maximum value detector.

Configured approximately in the same manner as the minimum value detector 141, as shown in FIG. 6, the maximum value detector 142 is composed of a comparator 142a for comparing the magnitudes of input data, a selector 142b for outputting one of two input data on the basis of the select signal that is output from the comparator 142a, and a maximum value register 142c for storing the update data that is output from the selector 142b.

The comparator 142a operates differently than the comparator 141a. That is, the comparator 142a compares the magnitudes of inputs A and B, and outputs, as a select signal (i.e., output S), "0" if the input A is greater than the input B and outputs "1" if the input A is smaller than or equal to the input B. The selector 142b operates in the same manner as the selector 141b. Like the minimum value register 141c, the maximum value register 142c replaces the storage value with the update data that is output from the selector 142b. The comparator 142a functions as a maximum value detecting and comparing unit, and the maximum value register 142c functions as a maximum value storing unit of the invention.

Each pixel data is input to the minimum value detector 141 and the maximum value detector 142 in parallel approximately simultaneously.

Next, the operation of the multifunction machine 10 will be described with reference to FIGS. 1, 2, and 5-7. A data communication between terminal apparatus connected to a public communication network that is analog lines is started in the following manner. First, the terminal apparatus are connected to each other via their NCUs. After establishment of a state that a communication using a speech signal is possible, a negotiation is made (i.e., a communication procedure for connection between modems of the terminal apparatus is followed) between the modems and a connection between the modems is established. Data that are sent from a transmission terminal apparatus is modulated into an analog signal by its modem, transmitted to the modem of a reception terminal apparatus via the public communication network, and demodulated into digital data by the modem of the reception terminal apparatus.

When the multifunction machine 10 in a non-communication state, to wait for arrival of fax data from another terminal apparatus, a waiting command is sent to the modem 165 under the control of the communication control unit 160. When receiving this command, the modem 165 performs a waiting operation. When the NCU 167 has received a connection request signal from another terminal apparatus, the NCU 167 is instructed to establish a connection to the public communication network. When a connection for analog communication has been established, a negotiation is made to establish a connection with the other terminal apparatus.

Upon completion of the negotiation, fax data are transmitted from the other terminal apparatus. In the multifunction machine 10, the modem 165 demodulates the fax data as an analog signal into image data in the same state as the image data were compressed in the other terminal apparatus. The compressed image data are supplied to the codec unit 161, where decompression (decoding) is performed. The image data that have been decoded by the codec unit 161 are stored in the image data storage area 155a of the RAM 155.

Then, the image data are printed by the recording unit 175. In this embodiment, ink jet recording type printing is performed. Therefore, the carriage (not shown) of the recording unit 175 is driven under the control of the recording control unit 170 and inks are jetted on the basis of the image data stored in the RAM 155. The recording control unit 170 controls the relative movement in the auxiliary scanning direction between a sheet being transported and the carriage, the relative movement in the main scanning direction between the sheet and the carriage being reciprocated, and the timing of ink jetting from the head that is mounted on the carriage, whereby an image is formed on the sheet that has been transported into the case 10a through the sheet inlet (not shown).

The printed sheet is ejected from the multifunction machine 10 through the sheet outlet 13. A user can obtain the image that has been fax-transmitted from the other terminal apparatus.

Next, sending of fax data from the multifunction machine 10 is performed in the following manner. First, a user places a fax original to be sent on the supply tray 15. After a telephone number (i.e., fax number) of another terminal apparatus is input by manipulating keys of the operating section 121, the communication control unit 160 controls the modem 165, whereby a connection request signal is transmitted to the other terminal apparatus that is identified by the telephone number via the public communication network to which the NCU 167 is connected. In the same manner as described above, a connection for analog communication is established between the multifunction machine 10 and the other terminal apparatus via the public communication network and a connection between the modems is completed, whereupon the fax original is read to send fax data.

Figure 7:
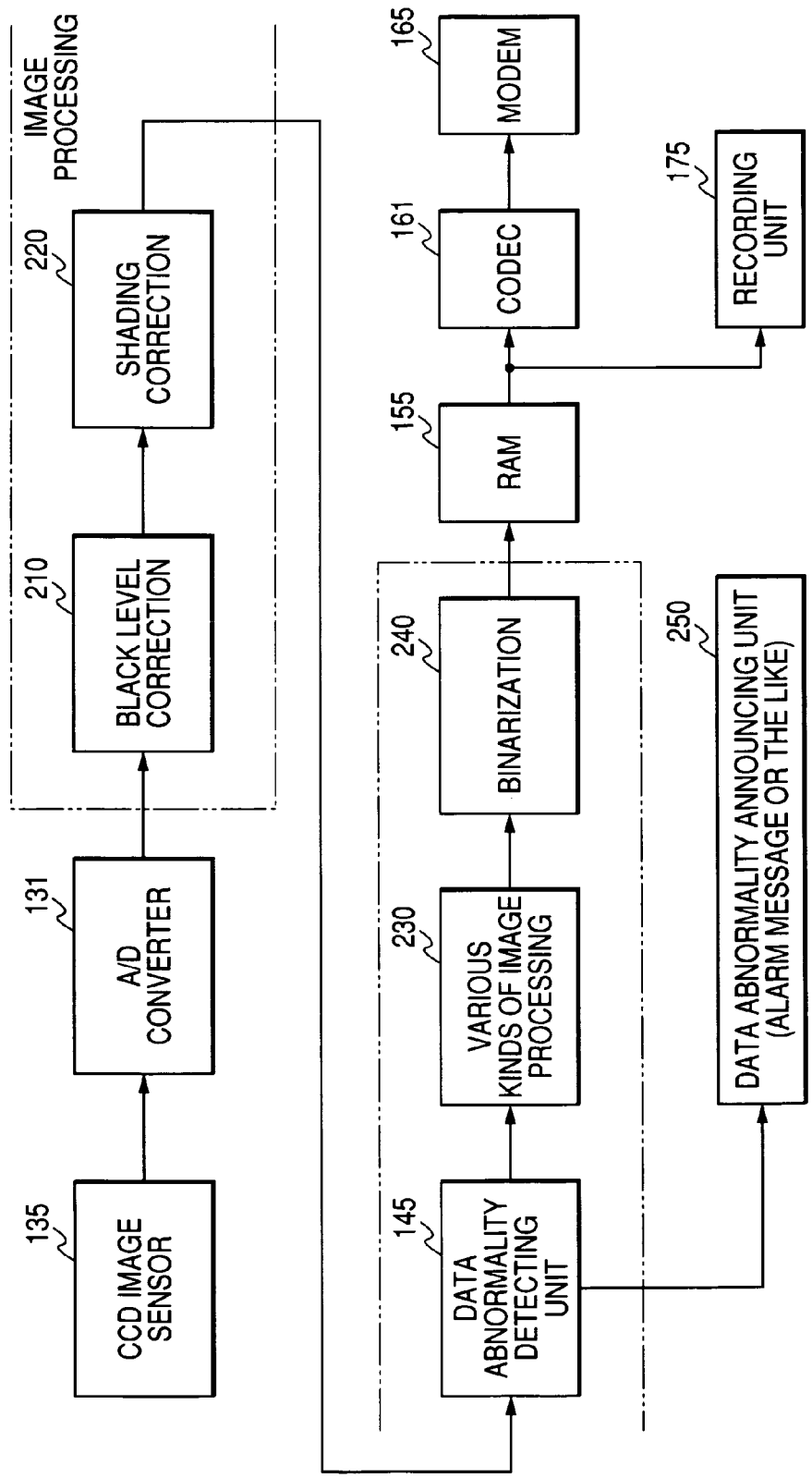
FIG. 7 is a data flow diagram showing how data flow when fax data are generated.

Fax data to be sent are generated according to a data flow diagram of FIG. 7. As shown in FIG. 7, an original is read and converted into image data, that is, an analog electrical signal by the CCD image sensor 135. Each image data is converted into digital data whose value is one of 256 gradations from "00h" (black) to "FFh" (white) by the A/D converter 131 of the reading control unit 130 (see FIG. 2). That is, in this embodiment, gradation information indicating black has the smallest value, the value of the gradation information increases with the lightness, and gradation information indicating white has the largest value. The digital data as the image data are subjected to a black level correction by a black level correcting unit 210 and then to a shading correction by a shading correcting unit 220.

Incidentally, the light source for emitting light that is necessary for reading of an original by the photodiodes 136 of the CCD image sensor 135 is a linear light source extending in the line direction of the CCD image sensor 135. A process that light emitted from the light source is reflected by an original, reflection light shines on the photodiodes 136 of the CCD image sensor 135, and the CCO image sensor 136 outputs gradation information of pixel data is influenced by various factors. For example, unevenness occurs that depends on the positions of the photodiodes 136 in their arrangement direction, deterioration of the light source with age disables uniform illumination with light, or the individual photodiodes 136 have a variation in sensitivity. Even if all the photodiodes 136 receive inputs under the same conditions, the CCD image sensor 135 does not necessarily produce a uniform output. The black level correction and the shading correction are performed by the known unit to correct for such unevenness in an output of the CCD image sensor 135. As a result, pixel data that are output from the A/D converter 131 as relative values are corrected into absolute values of 256 gradations from "00h" (black) to "FFh" (white).

The corrected pixel data are input to the data abnormality detecting section 145, where a maximum value and a minimum value among the data values are detected. That is, the corrected pixel data are input to the minimum value detector 141 of FIG. 5 and the maximum value detector 142 of FIG. 6. The value of the minimum value register 141c of the minimum value detector 141 and the value of the maximum value register 142c of the maximum value detector 142 are updated according to the pixel data. This update processing is performed for all the pixel data that constitute the image data of the original read above. Then, abnormality determination processing (steps S16 and S25 in FIG. 8) is performed on the basis of the values of the minimum value register 141c and the maximum value register 142c according to a data abnormality detecting program (described later). If a determination result "abnormal" is produced, a data abnormality announcing section 250 displays an alarm message or the like on the display section 122 (see FIG. 1).

If the image data are not abnormal, for example, known character emphasis processing and moire elimination processing are performed by various image processing unit 230. The gradation information (in 256 gradations) of each pixel data of the image data is classified into two values (two gradations) by a binarizing section 240 by using a binarization threshold value, and a resulting binary value is stored in the image data storage area 155a of the RAM 155. Then, the image data are encoded by the codec unit 161, modulated into an analog signal by the modem 165, and sent, as fax data, to another terminal apparatus connected to the multifunction machine 10.

Where the multifunction machine 10 is used as a copier, an original is read in the same manner as described above and resulting image data are printed by the recording unit 175 after being stored in the RAM 155. The CPU 110 that processes image data in the above-described manner using the black level correcting unit 210, the shading correcting unit 220, the data abnormality detecting section 145, the various image processing unit 230, and the binarizing section 240 function as an image processing apparatus of the invention.

Next, an operation that the data abnormality detecting section 145 detects an abnormality in image data will be described according to flowcharts with reference to FIGS. 8 through 14. Each step in the flowcharts will be abbreviated as "S."

The multifunction machine 10 according to the embodiment is provided with a text mode in which an original to be read as a fax original is such that, for example, a text and graphics are formed in black on a white sheet and a photograph mode in which a fax original is such that each pixel cannot be classified clearly as white or black as in the case that the fax original is a photograph or the ground of (the sheet of) the fax original is of a halftone such as gray. Switching between these modes is performed by making a mode flag in the work area 155c of the RAM 155 on or off on the basis of an input from the operating section 121. If the mode flag is off, the text mode is designated and a data abnormality detecting program for the text mode (see FIG. 8) is run. If the mode flag is on, the photograph mode is designated and a data abnormality detecting program for the photograph mode (see FIG. 12; described later) is run. The data abnormality detecting program for the text mode will be described below. The above data abnormality detecting programs are stored in a prescribed storage area of the ROM 157. The data abnormality detecting program for the text mode or the photograph mode is designated according to the mode flag and read from the work area 155c of the RAM 155 by the CPU 110. The text mode and the photograph mode correspond to a first determination mode and a second determination mode of the invention, respectively. The operating section 121 that is manipulated to make the mode flag on or off functions as a designating unit of the invention. The mode flag that is made on or off functions as a mode switching unit of the invention. The CPU 110 that designates a data abnormality detecting program according to the mode flag functions as a control unit of the invention.

To read an original for a fax transmission, for example, abnormality detection is performed on image data according to the flowchart of the data abnormality detecting program. As described above, the original is read by the CCD image sensor 135 and conversion to digital data (pixel data) is performed. Then, a minimum value and a maximum value of the pieces of gradation information of the pixel data are detected. At this time, the pixel data are output from the CCD image sensor 135 one by one in synchronism with reset pulses RS. The pixel data are sequentially input to the data abnormality detecting section 145 via the A/D converter 131, the black level correcting unit 210, and the shading correcting unit 220 and sequentially stored in the image data storage area 155a of the RAM 155 via the various image processing unit 230 and the binarizing section 240. Whether image data have an abnormality is determined when one page of the original has been converted into image data. If it is determined on the basis of a determination result that the abnormality can be canceled by changing a threshold value or the like, a user changes the threshold value or the like and the original is read again. Where the original consists of a plurality of pages, the data abnormality detecting program is run for each page.

Figure 8:
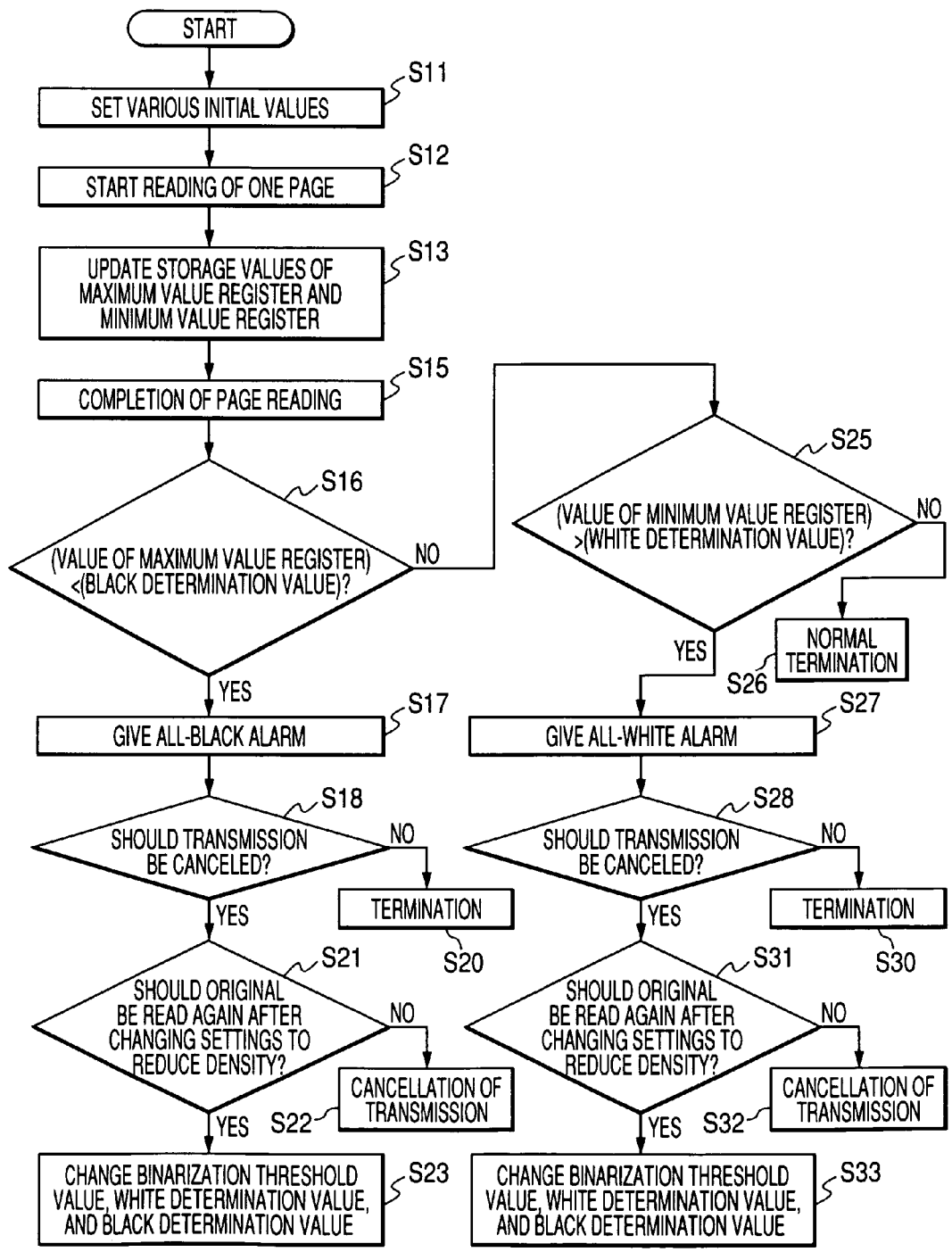
FIG. 8 is a flowchart of a data abnormality detecting program for detecting an abnormality in image data in a text mode.

When the data abnormality detecting program for the text mode shown in FIG. 8 is started, first various initial values are set (S1). At S1, a white determination value, a black determination value, and a binarization threshold value that are stored in the prescribed storage area of the ROM 157 are read out and stored in the determination value storage area 155b of the RAM 155. Values "FFh" and "00h" are stored in the minimum value register 141c of the minimum value detector 141 and the maximum value register 142c of the maximum value detector 142 as initial values of the minimum value and the maximum value, respectively. The white determination value is a threshold value to be used for determining whether the original is all white on the basis of the gradation information of the image data of the original read above. Likewise, the black determination value is a threshold value to be used for determining whether the original is all black. Optimum values of the initial values of the white determination value, the black determination value, and the binarization threshold value are determined in advance by, for example, conducting an experiment that all-white and all-black sheets are read by the multifunction machine 10. The white determination value and the black determination value correspond to a first threshold value and a second threshold value of the invention, respectively.

Then, reading of the original is started (S12). Until completion of the reading of the original (S15), pixel data of the original being read are sequentially input to the data abnormality detecting section 145 as described above and hence the storage values of the minimum value register 141c and the maximum value register 142c are updated successively (S13).

As shown in FIG. 5, pixel data that has been input to the minimum value detector 141 is input to the comparator 141a and the selector 141b as inputs A, respectively. A value "FFh" is stored in the minimum value register 141c of the minimum value detector 141 as an initial value at the time of resetting. The resetting is performed every time image data of one page have been processed. When an update timing signal is input to the minimum value register 141c, the storage value of the minimum value register 141c is input to the comparator 141a and the selector 141b as inputs B, respectively, as well as output from the minimum value detector 141.

The comparator 141a compares the inputs A and B. When a comparison is made first after resetting, the input B is "FFh." Therefore, if the input A is "E0h," for example, the comparator 141a outputs, as a select signal, "0," for example, indicating that the input A is smaller. On the basis of the select signal "0", the selector 141b allows only the input A to pass through itself, that is, outputs "E0h" as update data. The update data "E0h" overwrites the storage data of the minimum value register 141c.

Pixel data that is input next is compared with "E0h" that has been stored newly in the minimum value register 141*c* and the storage value of the minimum value register 141*c* is updated according to the same procedure as described above. As for the maximum value detector 142 shown in FIG. 6, an input value is compared with the storage value of the maximum value register 142*c* and the storage value of the maximum value register 142*c* is updated to a larger value according to a procedure similar to the above. In this manner, a minimum value of pixel data so far input is stored in the minimum value register 141*c* of the minimum value detector 141 and a maximum value of the pixel data so far input is stored in the maximum value register 142*c*, of the maximum value detector 142. The minimum value and maximum value update processing is continued until the reading of the one page of the original is completed at S15, that is, until all the pixel data of the image data are input to the data abnormality detecting section 145.

As shown in FIG. 8, upon the completion of the reading of the one page of the original, the value of the maximum value register 142*c* is referred to and it is checked whether the value of the maximum value register 142*c* is smaller than the black determination value that is stored in the determination value storage area 155*b* (S16). Where the gradations of the original are scattered moderately as exemplified in FIG. 9, the value of the maximum value register 142*c* is updated successively with "00h" as an initial value and finally becomes a value of the gradation information of the pixel data of a whitest portion of the original, the value being close to "FFh." Since the value of the maximum value register 142*c* becomes greater that the black determination value (S16: no), the value of the minimum value register 141*c* is referred to and it is checked whether the value of the minimum value register 141*c* is greater than the white determination value (S25). In the example of FIG. 9, the value of the minimum value register 141*c* is updated successively with "FFh" as an initial value and finally becomes a value of the gradation information of the pixel data of a blackest portion of the original, the value being close to "00h." The value of the minimum value register 141*c* becomes smaller than the white determination value (S25: no). With this original, it is determined that texts and graphics formed on the original can be recognized correctly and the data abnormality detecting program is finished normally (S26). Image data that have been processed by the various image processing unit 230 and the binarizing section 240 (see FIG. 7) and stored in the image data storage area 155*a* as described above after the above processing are subjected to processing of sending the image data as fax data. The CPU 110 that determines whether the image data are abnormal by comparing the maximum value and the minimum value of the pieces of gradation information of all the pixel data with the black determination value and the white determination value at S16 and S25 (determination steps), respectively, functions as a detecting unit and a determining unit of the invention.

As exemplified in FIG. 10, if most of the gradations of the original are black, at S13 the value of the maximum value register 142*c* is updated toward the initial value "00h" only slightly. If the value of the maximum value register 142*c* at the end of the processing of updating it is smaller than the black determination value (S16: yes), the original is determined all black. An alarm display to the effect that the original is all black is made on the display section 122 shown in FIG. 1 (S17). Then, a display to urge a user to determine whether to cancel the sending of the image data as fax data is made (S18). If the user intends to send the all-black original and gives an instruction to send the image data as they are by manipulating the operating section 121 (S18: no), the data abnormality detecting program is finished (S20) and the image data having the all-black gradation information are sent as fax data as they are.

If the user gives an instruction to cancel the sending of fax data by manipulating the operating section 121 (S18: yes) in response to the alarm to the effect that the original is all black, a display to urge the user to determine whether to change is the settings to lower the original reading density is made (S21). If the user gives an instruction not to read the original again by manipulating the operating section 121 (S21: no), the data abnormality detecting program is finished (S22) and the sending of fax data is canceled.

However, if, for example, the ground gradation of the original is gray that is close to black and a text and graphics on the original are formed in black, there may occur a case that all the pieces of gradation information of pixel data obtained by reading the original are smaller than the black determination value. In this case, the original can be read correctly by changing the black determination value, the white determination value. Therefore, it an instruction to read the original again is given (S21: yes), a picture for change of the white determination value and the black determination value is displayed on the display section 122 (S23). A new white determination value and black determination value that have been input through the operating section 121 are stored in the determination value storage area 155*b*. Then, the process returns to S12 to read the original again. The center value between the white determination value and the black determination value is set as a new binarization threshold value. In changing the determination values, the storage values of the minimum value register 141*c* and the maximum value register 142*c* may be displayed on the display section 122 as rough measures of the determination values. The binarization threshold value need not always be the center value between the white determination value and the black determination value and may be set at an arbitrary value. At S23, an instruction to set the original on the supply tray 15 again is also displayed.

As shown in FIG. 11, if most of the gradations of the original are white, at S13 the value of the minimum value register 141*c* is updated toward the initial value "FFh" only slightly. In this case, the value of the minimum value register 141*c* is determined greater than the white determination value (S25: yes), that is, the original is determined all white. Then, in the same manner as at steps S17 through S23, an all-white alarm is given and the image data are sent as fax data as they are or the original is read again after changing the determination values in accordance with inputs from the user (S27 through S33). If the original should be read again, the process is returned to S12 in the same manner as described above. The CPU 110 that causes a change of the white determination value and the black determination value at S23 or S33 functions as a threshold value changing unit of the invention.

Since an alarm is given if an original read is all white or all black, the user can recognize whether the original for fax transmission is set upside down and the original itself is proper. An erroneous determination is less apt to occur in the case of an original in which, for example, a text and graphics are formed in black on a white-ground sheet, because the gradation of the ground is much different from that of the text and graphics. However, a determination result "no" may be produced at both of S16 and S25 (determination steps) in a case that the gradations of an original does not have a large variation, for example, when a photograph original is read or both of the gradation of the ground of an original and the gradation of a text and graphics formed on the original are halftone. In view of the above, switching may be made from the text mode to the photograph mode on the basis of what is called an attribute of an original. If such switching is made, original reading and data abnormality detection are performed in the photograph mode.

Figure 12:
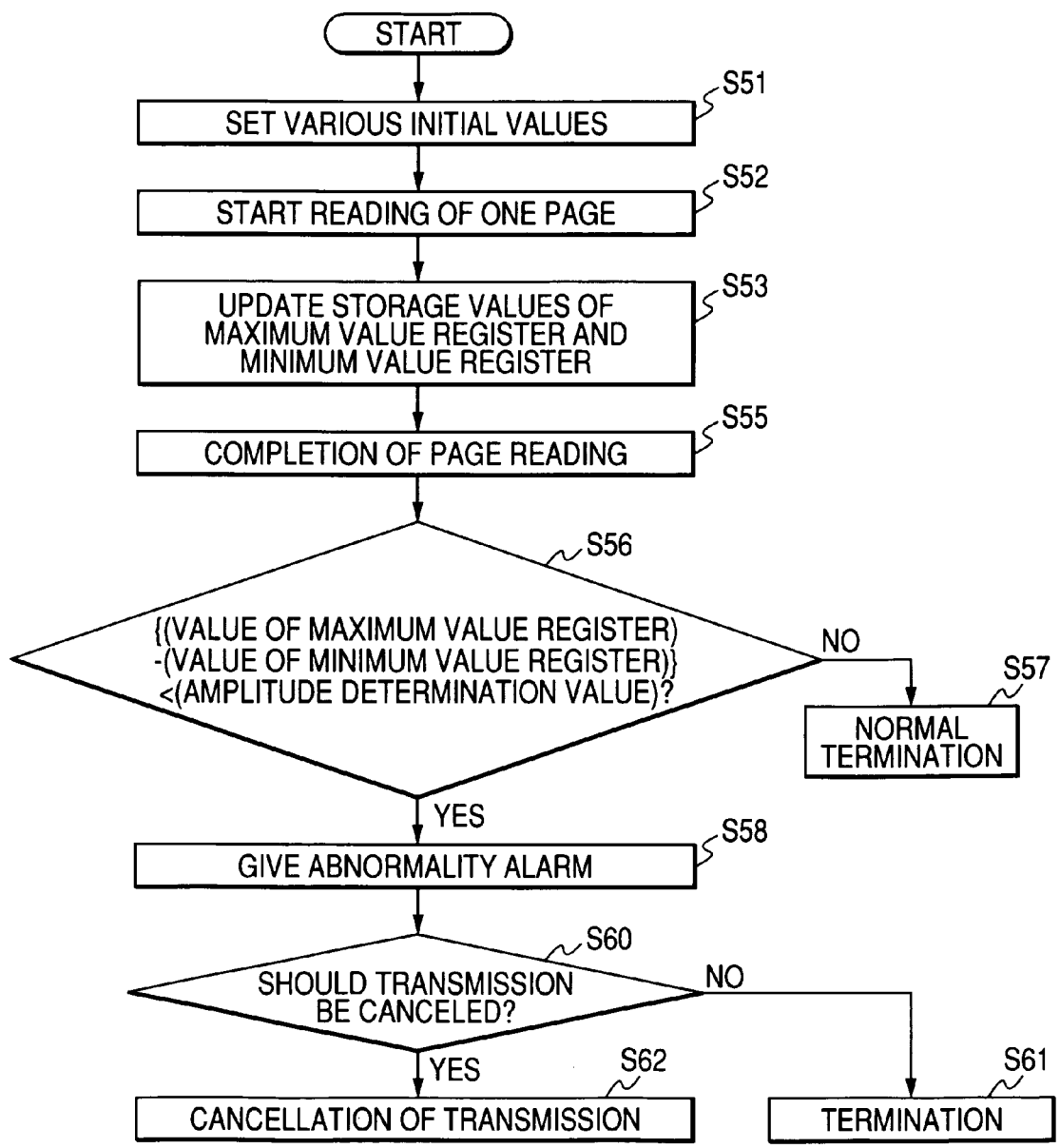
FIG. 12 is a flowchart of a data abnormality detecting program for detecting an abnormality in image data in a photograph mode.

If the mode flag in the work area 155c is made "on" by manipulating the operating section 121, the multifunction machine 10 reads an original in the photograph mode. When the data abnormality detecting program for the photograph mode is started, as shown in FIG. 12, various initial values are set as in the case of the text mode (S51). That is, initial values of the white determination value, the black determination value, the binarization threshold value, and an amplitude determination value are read from the ROM 157 and stored in the determination storage area 155b of the RAM 155. Values "FFh" and "00h" are stored in the minimum value register 141C and the maximum value register 142c, respectively. The amplitude determination value is used for determining whether the gradations of an original are almost uniform by comparing it with the difference between the gradation information of pixel data of a whitest portion of the original and that of a blackest portion. Like the other determination values, the amplitude determination value is determined by an experiment or the like.

The original is read and the storage values of the minimum value register 141c and the maximum value register 142c are updated (S52 through S55) in the same manner as in S12 through S15 (see FIG. 8) in the text mode.

Figure 13:
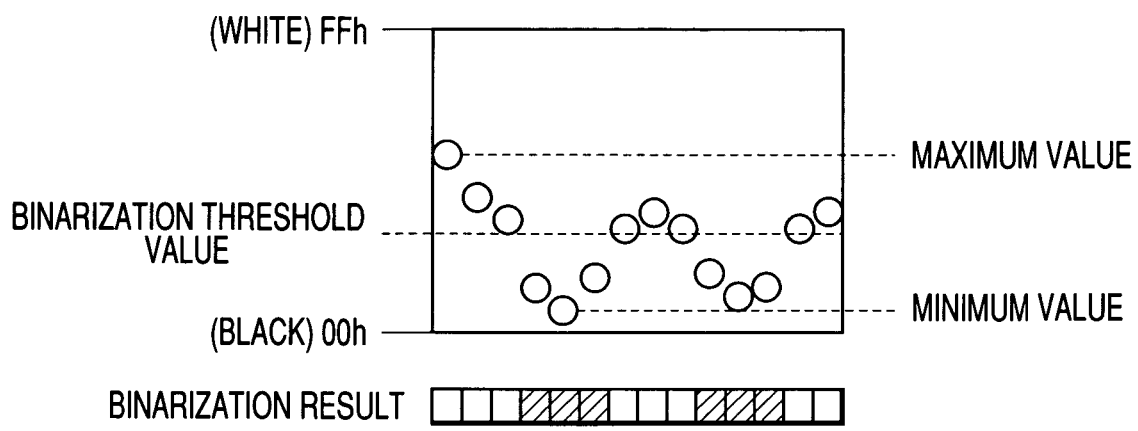
FIG. 13 shows examples of a minimum value and a maximum value of pieces of gradation information that are obtained by reading an original in which the ground color is gray and a black text are formed.

After completion of the reading of the original, the difference between the values of the maximum value register 142c and the minimum value register 141c is calculated and it is checked whether the difference is smaller than the amplitude determination value that is stored in the determination storage area 155b (S56). If, for example, an original in which the gradation of the ground is gray and the gradation of a text and graphics formed on the original is black as exemplified in FIG. 13 is read, image data have pieces of gradation information that are scattered between those gradations. The value of the maximum value register 142c becomes an intermediate value (e.g., "70h") that is the gradation information of pixel data of a whitest portion (i.e., the ground gradation) of the original and the value of the minimum value register 141c becomes a value (e.g., "10h") that is the gradation information of pixel data of a blackest portion (i.e., the gradation of a text or a figure) of the original and is close to "00h." Therefore, if the amplitude determination value is set at "10h," for example, the difference between the values of the maximum value register 142c and the minimum value register 141c ("60h" in this example) is greater than the amplitude determination value (S56: no). With this kind of original, it is determined that the text and graphics formed on the original can be recognized normally. The data abnormality detecting program is finished normally (S57) and fax data are sent. The CPU 110 that determines whether image data are abnormal by comparing the difference between a maximum value and a minimum value of all the pixel data at S56 functions as an amplitude determining unit of the invention.

Figure 14:
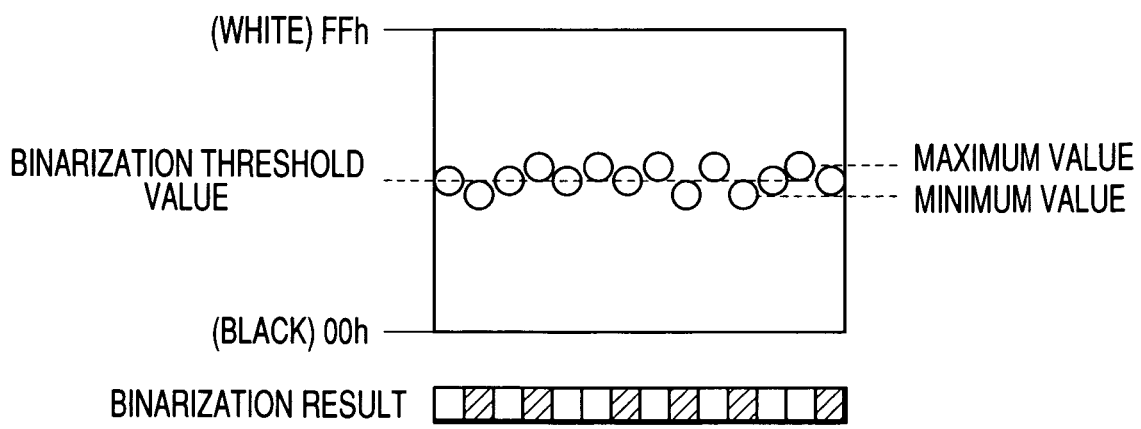
FIG. 14 shows examples of a minimum value and a maximum value of pieces of gradation information that are obtained by reading an original in which the ground color is gray and no texts and graphics are printed.

On the other hand, where no text or graphics are formed on the original as exemplified in FIG. 14, at S53 the difference between the values of the maximum value register 142c and the minimum value register 141c is very small (e.g., "70h" and 62h, respectively). In this case, the difference becomes "0Eh" and hence is smaller than the amplitude determination value "10h" (S56: yes). When this kind of original is read, it is determined that there is almost no difference between the gradation of the ground of the original and the gradation of the text, that is, image data are determined abnormal, though the texts or graphics are formed on the original. An alarm display is made on the display section 122 shown in FIG. 1 (S58).

Then, a display to urge a user to determine whether to cancel the sending of the image data as fax data is made (S60) if the user gives an instruction to send the image data by manipulating the operating section 121, the data abnormality detecting program is finished (S60: no and S61) and fax data of the image data having gray gradation information are sent as they are. If the user inputs an instruction to cancel the sending of fax data (S60: yes), the data abnormality detecting program is finished (S62) and the sending of fax data is canceled.

As described above, in the multifunction machine 10 according to the invention, an original is read by the CCD image sensor 135 when a fax communication, copying, or the like is performed. An output of the CCD image sensor 135 is converted into digital data by the A/D converter 131, corrected, and then input to the data abnormality detecting section 145. In the abnormality detecting unit 145, pixel data are sequentially input to each of the minimum value detector 141 and the maximum value detector 142, which detect a minimum value and a maximum value, respectively, of the pieces of gradation information of the pixel data. The pixel data are subjected to the binarization processing of the binarizing section 240 and then stored in the image data storage area 155a.

On the other hand, when all the pixel data of the image data of the original have been input to the abnormality detecting unit 145, the storage values of the minimum value register 141c and the maximum value register 142c are compared with the white determination value and the black determination value, respectively. If a condition for a data abnormality is satisfied, an alarm display is made on the display section 122. A user can cancel the sending of fax data. Alternatively, if the original has no particular abnormality, the user can attempt to attain normal reading of the original by changing the settings of the white determination value and the black determination value.

The above operation is performed in the case of detecting a data abnormality in the text mode for reading an original in which, for example, a black text and graphics are formed on a white ground. However, the photograph mode may be designated in the case of reading an original having a gray ground, a photograph original, or the like. In this case, a data abnormality can be detected on the basis of whether the difference between the gradation of the ground of the original and the gradation of a texts and graphics are smaller than the amplitude determination value.

Detecting a data abnormality using the gradation information of image data before their binarization makes it possible to detect a data abnormality even for an original for which it is difficult to determine whether data obtained by reading it are abnormal such as an original having a halftone ground.

Various modifications can also be applied to the embodiment described above. For example, the white determination value, the black determination value, and the binarization threshold value may be changed by determining the gradation of the ground of an original by reading a margin of the original. This is realized in the following manner. When pixel data of 10 lines, for example, from a reading start position of an original have been input to the image processing section 140 at S13 in the flowchart (see FIG. 8) of the data abnormality detecting program (this instant can be determined on the basis of amount of pixel data), a minimum value of the pieces of gradation information of the pixel data so far input is stored in the minimum value register 141c. The white determination value is changed with an understanding that these pieces of gradation information correspond to a margin of the original, that is, represent the ground of the original. The minimum value of the pixel data is output from the minimum value detector 141, and the white determination value stored in the determination storage area 155*b* is changed so as to be smaller than the minimum value (e.g., by multiplying the minimum value by a value obtained by an experiment or the like). The binarization threshold value is changed to the center value between the white determination value and the black determination value as in the case of the above embodiment. Then, the remaining part of the original is read and S15 and the following steps are executed. It is also possible to urge a user to input a value such as a white, determination value, a black determination value and a binarization threshold value by manipulating the operating section 121 on the basis of the gradation of the ground of an original and detects a data abnormality using those values.

Figure 15:
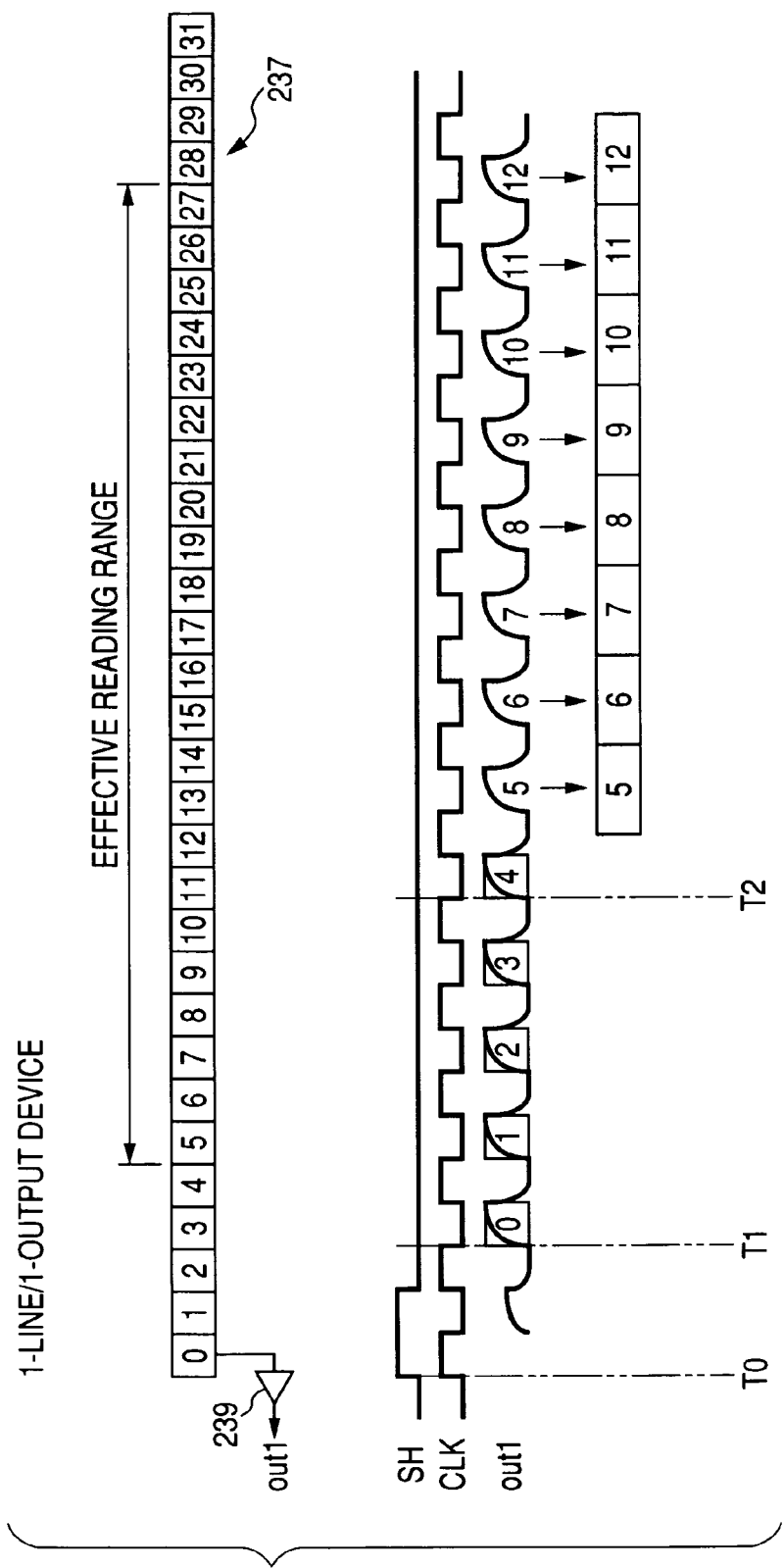
FIG. 15 is a timing chart illustrating the operation timing of a CIS as an exemplary 1-line/1-output device.
Figure 16:
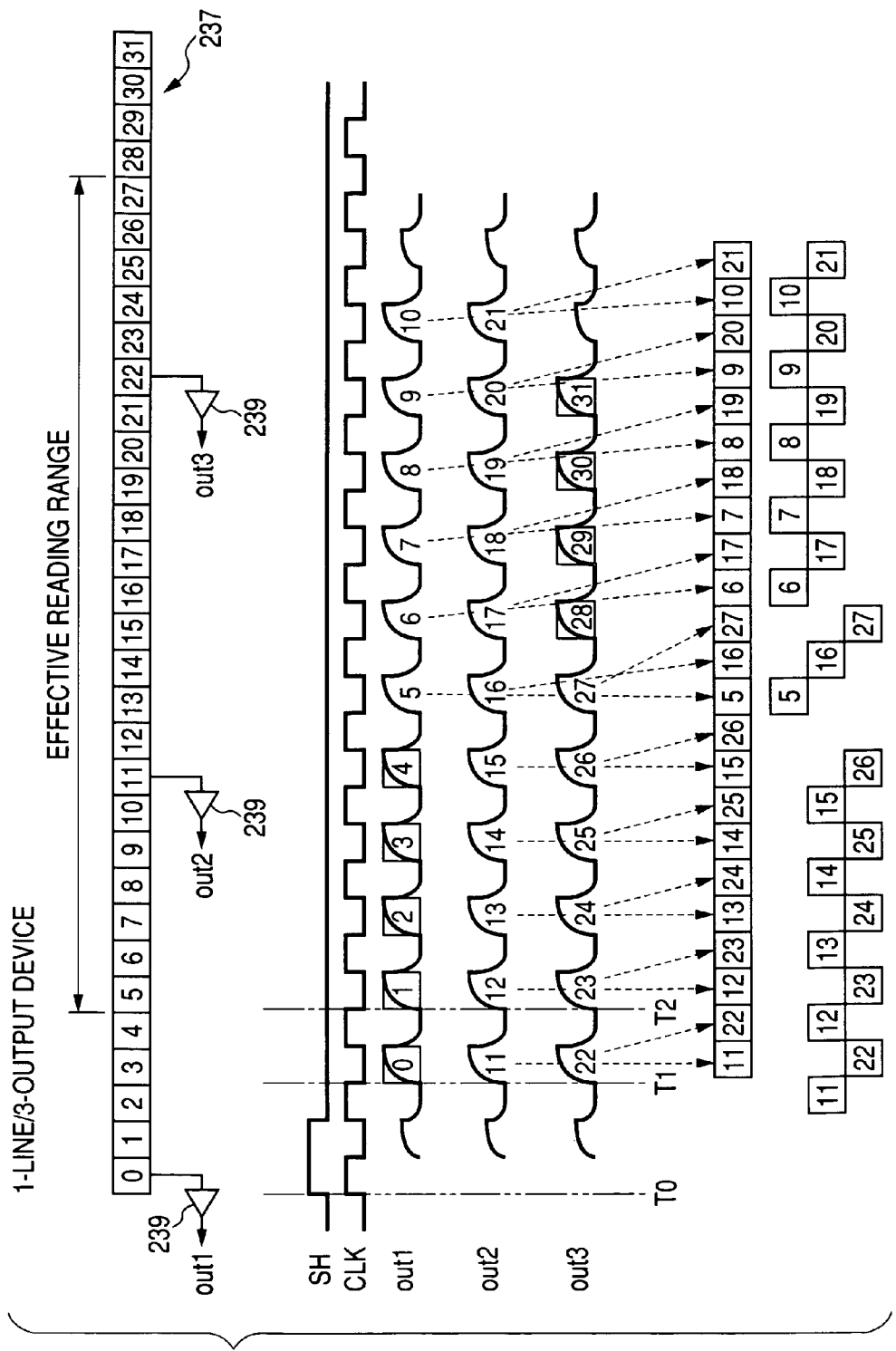
FIG. 16 is a timing chart illustrating the operation timing of a CIS as an exemplary 1-line/3-output device.

It is possible to detect a device abnormality using the data abnormality detecting section 145. Before the description of this modification, a process that data of an original captured by a CIS are output will be described with reference to FIGS. 15-17. As described above, as in the case of the CCD image sensor, thousands of photodiodes are arranged on one line of the CIS. The following description will be directed to a case that 32 photodiodes are arranged (called diodes #0 to #31 from the side closer to an amplifier 239). In FIGS. 15 and 16, analog shift registers 237 associated with the respective diodes are shown but other components such as the diodes are omitted. The following description will be directed to a case that the CIS incorporates CCD sensors. However, the CIS may incorporate CMOS (complementary metal-oxide-semiconductor) sensors.

As shown in FIG. 15, when a shift pulse SH is input to a shift gate (not shown) at time T0, the charges accumulated in the respective photodiodes are transferred to corresponding cells of the analog shift registers 237. After time T1, the charges captured in the analog shift registers 237 are shifted toward the amplifier 239 in synchronism with the falls of clock pulses CLK. As a result, for each cycle of the clock pulses CLK, a charge corresponding to one photodiode is output from the side of the one end photodiode (in this example, photodiode #0) of the arrangement of the photodiodes as an output of the analog shift registers 237. The CIS, more specifically, the amplifier 239, outputs pixel data having gradation information of one pixel for each cycle of the clock pulses CLK as an output out1 in which the magnitude of the voltage varies in proportion to the amount of charge corresponding to the individual photodiode.

Pixel data of charges that are output from the analog shift registers from time T1 to time T2, that is, pixel data corresponding to photodiodes #0 to #4, are pixel data of charges accumulated by the photodiodes out of the effective reading range. Therefore, these pixel data are discarded in the reading control unit 130 after being converted into digital data by the A/D converter 131 (see FIG. 2). Pixel data corresponding to photodiodes #28 to #31 are also discarded in a similar manner.

The CIS having the above configuration is what is called a 1-line/1-output device that performs reading along one line and produces an output from one output channel. On the other hand, pixel data can be output at high speed from the CIS by using a 1-line/3-output device shown in FIG. 16 in which the photodiodes are grouped into photodiodes #0-#10, photodiodes #11-#21, and photodiodes #22-#31 and outputs out1, out2, and out3 are produced from the groups of analog shift registers 237 associated with photodiodes #0-#10, photodiodes #11-#21, and photodiodes #22-#31, respectively.

In the CIS of FIG. 16, as in the CIS of FIG. 15, charges are transferred from the photodiodes to the analog shift registers 237 at time T0 in synchronism with a shift pulse SH. At time T1, pixel data obtained by reading an original by photodiodes #0, #11, and #22 are output simultaneously from the CIS to the A/D converter 131 as the outputs out1, out2, and out3, respectively. Similarly, at time T2, pixel data corresponding to photodiodes #1, #12, and #23 are output as the outputs out1, out2, and out3, respectively. Subsequently, pixel data corresponding to the respective groups of photodiodes are output in a similar manner in order of the arrangement of the photodiodes. Therefore, three times more data can be output than in the exemplary CIS of FIG. 15 with the same clock timing as in the CIS of FIG. 15. In the A/D converter 131, the pixel data that are output from the CIS in this manner are combined together so as to be arranged in order of the outputs out1, out2, and out3 in synchronism with each clock pulse. The pixel data corresponding to the photodiodes out of the effective reading range are discarded in the reading control unit 130 and resulting pixel data are output to the image processing unit 140.

A 3-line-3-output device shown in FIG. 17 as the CCD image sensor 135 is such that to produce color image data by reading an original the photodiodes 136 are arranged parallel in three lines. Photodiodes 136*r*, photodiodes 136*g*, and photodiodes 136*b* that are provided with red, green, and blue filters are associated with analog shift registers 137*r*, analog shift registers 137*g*, and analog shift registers 137*b*, respectively. Light emitted from a light source is reflected by an original and, as is well known, lightness values of light beams corresponding to the three primary colors of light are detected by the photodiodes 136*r*, 136*g*, and 136*b*. Therefore, pixel data of red, green, and blue are output from the outputs out1, out2, and out3, respectively.

As in the examples of FIGS. 15 and 16, at time T0, charges are transferred from the photodiodes 136*r*, 136*g*, and 136*b* to the analog shift registers 137*r*, 137*g*, and 137*b* in synchronism with a shift pulse SH. At time T1 that is synchronized with a reset pulse RS, pixel data obtained by reading an original by photodiodes #0 are output simultaneously to the A/D converter 131 as the outputs out1, out2, and out3, respectively. Similarly, at time T2, pixel data corresponding to photodiodes #1 are output as the outputs out1, out2, and out3, respectively. Subsequently, pixel data that are output in order of the arrangement of the photodiodes are combined together in the A/D converter 131. The pixel data corresponding to the photodiodes out of the effective reading ranges (not shown) are discarded in the reading control unit 130 and resulting pixel data are output to the image processing unit 140.

When detecting abnormality of each of the output device in a case where a plurality of output devices are provided, such as those of the 1-line/3-output device shown in FIG. 16, and the 3-line/3-output device shown in FIG. 17, a plurality of the data abnormality detecting sections 145 are provided. The number of the data abnormality detecting sections 145 to be provided should be at least the same numbers as the number of outputs of the device to detect the abnormality in data output.

Each of the output(s) of the 1-line/1-output device of FIG. 15, the 1-line/3-output device of FIG. 16, or the 3-line/3-output device of FIG. 17 is processed by the data abnormality detecting section 145 of the image processing unit 140, respectively, whereby a maximum value and a minimum value of the pieces of gradation information of image data are determined in the same manner as in the embodiment. If the value of the minimum value register 141*c* remains "FFh" at the time point of completion of reading for all the pixel data of image data, it can be determined that the reading of lightness values of the pixels has not been performed normally because of occurrence of some abnormality in the path from the CCD image sensor 135 or the CIS to the reading control section 130 (A/D converter 131). This is based on the experimentally confirmed fact that gradation, information obtained by reading an original through the glass plate should be smaller than "FFh" to whatever extent the original is close to complete white because lightness values obtained by reading the original are smaller than those obtained by reading a white reference tape (not shown) without intervention of the glass plate ("FFh" is gradation information of the white reference tape that is read as a reference of complete white for the corrections of the above-mentioned, known black level correcting unit 210 and shading correcting unit 220). Similarly, if the value of the maximum value register 142c remains "00h," it can be determined that a device abnormality has occurred. In this manner, in the case of the 1-line/1-output device, occurrence of an abnormality somewhere in the entire device can be detected. In the case of the 1-line/3-output device, a local device abnormality can be detected. In the case of the 3-line/3-output device, a line where a device abnormality has occurred can be determined.

For example, the determination processing for detecting a device abnormality may be realized in the following manner. In the flowchart of FIG. 8, if the determination result at S25 is "no," it is checked whether the values of the minimum value register 141c and the maximum value register 142c are equal to "FFh" and "00h," respectively. If those values are not equal to "FFh" and "00h," respectively, the process goes to S26. If one of those values is equal to "FFh" or "00h," a display for announcing occurrence of a device abnormality to a user is made on the display section 122.

The multifunction machine 10 has been described in the embodiment as an example of an apparatus that is equipped with an image processing apparatus and an image reading apparatus. However, the invention can also be applied to apparatus having an image reading apparatus including an image copying apparatus such as a copier, a facsimile machine, and a scanner. Further, for example, the image processing apparatus according to the invention may be applied to processing on an image to be displayed on an image display device that performs binary display (e.g., E-Paper (registered trademark of Fuji Xerox Co., Ltd.)).

In the embodiment, the display section 122 that is a liquid crystal display is used as the announcing unit. However, for example, the announcement may be made by sound generation using a piezoelectric buzzer or a speaker and its control unit or light emission using a light-emitting unit such as LEDs and its control unit. In the embodiment, the switching between the text mode and the photograph mode is made by on/off switching of the mode flag. However, the switching between the text mode and the photograph mode may be made in the following manner. For example, data indicating an attribute to be used for discrimination between a case that the gradation of the background of an image that is formed on the basis of image data is white or black and a case that it is a halftone is added to image data. When image data are read, the switching between the text mode and the photograph mode is made by making the mode flag on or off on the basis of the data indicating the attribute.

In the multifunction machine 10, a fax original is read after a connection with another terminal apparatus has been established. Another procedure may be employed in which a connection with another terminal apparatus and a fax communication is performed after a fax original is read. In the embodiment, it is assumed that the pieces of gradation information of image data representing black and white are "00h" and "FFh," respectively. However, a modification is possible in which the pieces of gradation information of image data representing black and white are "FFh" and "00h," respectively, and the magnitude relationships involving the determination values are reversed from those of the embodiment. Although in the embodiment the gradation information is 8-bit digital data (256 gradations), it may be 7-bit data (128 gradations) or 12-bit data (4,096 gradations), for example; it may be data of an arbitrary number of gradations.

As described above, the image processing apparatus according to the present invention can detect an abnormality in input multi-gradation image data in the case where the image data are binarized. Therefore, abnormality detection can be performed on even image data having gradations on which abnormality detection is hard to perform after binarization.

The image processing apparatus according to the present invention provides the following advantage in addition to the advantage described above. The detecting unit compares the pieces of gradation information of individual pixels of input image data with each other, detects and stores their maximum value and minimum value, and detects an abnormality in the image data on the basis of the maximum value and the minimum value. Therefore, an abnormality in the image data can be detected with a simple configuration.

The image processing apparatus according to the present invention provides the following advantage in addition to the advantages described above. The determining unit of the detecting unit can determine that all the image data are data indicating white if the minimum value of the pieces of gradation information of the image data is larger than the first threshold value, and can determine that all the image data are data indicating black if the maximum value of the pieces of gradation information of the image data is smaller than the second threshold value. Therefore, when all the image data that are input to the image processing apparatus are data indicating white or black, it can be detected easily that the image data are abnormal.

The image processing apparatus according to the present invention provides the following advantage in addition to the advantages described above. Setting the first threshold value and the second threshold value to arbitrary values makes it possible to prevent an erroneous determination in a case that most of the image data are data indicating white or black.

The image processing apparatus according to the present invention provides the following advantage in addition to the advantages described above. The first threshold value and the second threshold value can be set to arbitrary values on the basis of the gradation information of image data containing no image, that is, the ground gradation of the image data. Therefore, even if image data have only a single gradation, that is, only a ground gradation, the image data can be determined abnormal.

The image processing apparatus according to the present invention provides the following advantage in addition to the advantages described above. The first threshold value can be set smaller than a maximum value of pieces of gradation information if a minimum value of the pieces of gradation information is smaller than the first threshold value and the maximum value is larger than the second threshold value when a prescribed amount of data as measured from the head of image data has been input. Therefore, when the ground gradation is not a gradation representing white, the first threshold value is changed on the basis of a ground gradation that is determined from a margin. This makes it possible to determine that image data are abnormal even if the image data have only a single gradation, that is, only a ground gradation.

The image processing apparatus according to the present invention provides the following advantage in addition to the advantages described above. Image data are determined abnormal if the difference between a maximum value and a minimum value of pieces of gradation information of the image data is small. Therefore, an abnormality can be detected in image data even if not all the gradations of the ground of the image data are black or white.

The image processing apparatus according to the present invention provides the following advantage in addition to the advantages described above. The mode switching unit makes it possible to switch between the first determination mode and the second determination mode. Therefore, an abnormality can be detected in image data even if all the gradations of the ground of the image data are white, black, or an intermediate gradation between them.

The image reading apparatus according to the present invention detects an abnormality in image data produced by reading an original. If an abnormality is detected in the image data, the detection of the abnormality can, be announced.

The image reading apparatus according to the present invention provides the following advantage in addition to the advantage described above. In the case of a photograph original, detection of an abnormality in image data can be performed in the second determination mode. In the case of a non-photograph original, detection of an abnormality in image, data can be performed in the first determination mode. Therefore, an abnormality in image data can be detected irrespective of the ground gradation of the image data.

The image reading apparatus, according to the present invention provides the following advantage in addition to the advantages described above. Since an abnormality in gradation information can be detected for each of sets of image data of portions of an original that are read by a plurality of channels of a CCD image sensor or a CIS, a partial failure of the CCD image sensor or the CIS can be found.

The image reading apparatus according to the present invention provides the following advantage in addition to the advantage described above. In the case of color reading, an abnormality in gradation information can be detected on the basis of sets of image data obtained by reading an original with a CCD image sensor or a CIS for respective colors.

The image copying apparatus according to the present invention can detect an abnormality in an original before an image of the original read is formed on a recording medium. This prevents useless consumption of recording media.

The facsimile machine according to the present invention can detect an abnormality in an original before an image of the original read is sent to another terminal apparatus. This prevents sending of an erroneous original.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing apparatus comprising:
   an input section configured to be input image data having gradation information of at least 2-bits per pixel;
   a detecting section configured to detect an abnormality in the gradation information of the image data input to the input section;
   an announcing section configured to announce the detection of the abnormality in a case where the abnormality is detected by the detecting section;
   a binarizing section configured to binarize the gradation information of the image data into 1-bit per pixel; and
   an output section configured to output the image data binarized by the binarizing section.

2. The image processing apparatus as claimed in claim 1, wherein the gradation information of each pixels are sequentially input to the detecting section,
   wherein the detecting section comprises:
   a minimum value storing unit configured to store a minimum value of the gradation information; and
   a minimum value comparing unit configured to compare the minimum value of the gradation information so far being input and stored in the minimum value storing unit and a value of the gradation information that is next input, and to set the smaller one into the minimum value storing unit as a new minimum value, and
   wherein the detecting section detects the abnormality of, the gradation information based on the minimum value stored in the minimum value storing unit.

3. The image processing apparatus as claimed in claim 2, wherein the detecting section further comprises a detecting unit configured: to compare the minimum value stored in the minimum value storing unit with a first threshold value in which to be used for determining whether all of the input image data are uniform in graduation; and to detect the abnormality that all of the input image data are uniform in graduation in a case where the minimum value is larger than the first threshold value.

4. The image processing apparatus as claimed in claim 3, wherein the detecting unit detects the abnormality that all of the input image data are data indicating white in a case where the minimum value is larger than the first threshold value.

5. The image processing apparatus as claimed in claim 3, wherein the detecting unit detects the abnormality that all of the input image data are data indicating black in a case where the minimum value is larger than the first threshold value.

6. The image processing apparatus as claimed in claim 3 further comprising a threshold value changing unit configured to set the first threshold value to arbitrary value.

7. The image processing apparatus as claimed in claim 6, wherein the threshold value changing unit sets the, first threshold value based on the gradation information of input image data containing no image.

8. The image processing apparatus as claimed in claim 1, wherein the gradation information of each pixels are sequentially input to the detecting section,
   wherein the detecting section comprises:
   a maximum value storing unit configured to store a maximum value of the gradation information; and
   a maximum value comparing unit configured to compare the maximum value of the gradation information so far being input and stored in the maximum value storing unit and a value of the gradation information that is next input, and to set the larger one into the maximum value storing unit as a new maximum value, and wherein the detecting section detects the abnormality of the gradation information based on the maximum value stored in the maximum value storing unit.

9. The image processing apparatus as claimed in claim 8, wherein the detecting section further comprises a detecting unit configured: to compare the maximum value stored in the maximum value storing unit with a second threshold value in which to be used for determining whether all of the input image data are uniform in gradation; and to detect the abnormality that all of the input image data are uniform in graduation in a case where the maximum value is smaller than the second threshold value.

10. The image processing apparatus as claimed in claim 9, wherein the detecting unit detects the abnormality that all of the input image data are data indicating white in a case where the maximum value is smaller than the second threshold value.

11. The image processing apparatus as claimed in claim 9, wherein the detecting unit detects the abnormality that all of the input image data are data indicating black in a case where the maximum value is smaller than the second threshold value.

12. The image processing apparatus as claimed in claim 9 further comprising a threshold value changing unit configured to set the second threshold value to arbitrary value.

13. The image processing apparatus as claimed in claim 12, wherein the threshold value changing unit sets the second threshold value based on the gradation information of input image data containing no image.

14. The image processing apparatus as claimed in claim 1, wherein the gradation information of each pixels are sequentially input to the detecting section,
wherein the detecting section comprises:
a minimum value storing unit configured to store a minimum value of the gradation information;
a maximum value storing unit configured to store a maximum value of the gradation information;
a minimum value comparing unit configured to compare the minimum value of the gradation information so far being input and stored in the minimum value storing unit and a value of the gradation information that is next input, and to set the smaller one into the minimum value storing unit as a new minimum value; and
a maximum value comparing unit configured to compare the maximum value of the gradation information so far being input and stored in the maximum value storing unit and a value of the gradation information that is next input, and to set the larger one into the maximum value storing unit as a new maximum value, and
wherein the detecting section detects the abnormality of the gradation information based on the minimum value stored in the minimum value storing unit and the maximum value stored in the maximum value storing unit.

15. The image processing apparatus as claimed in claim 14, wherein the detecting section further comprises a detecting unit configured:
to compare the minimum value stored in the minimum value storing unit with a first threshold value in which to be used for determining whether all of the input image data are uniform in graduation;
to detect the abnormality that all of the input image data are uniform in graduation in a case where the minimum value is larger than the first threshold value;
to compare the maximum value stored in the maximum value storing unit with a second threshold value in which smaller than the first threshold value and to be used for determining whether all of the input image data are uniform in graduation; and
to detect the abnormality that all of the input image data are uniform in graduation in a case where the maximum value is smaller than the second threshold value.

16. The image processing apparatus as claimed in claim 15, wherein the detecting unit detects the abnormality that all of the input image data are data indicating white in a case where the minimum value is larger than the first threshold value, and detects the abnormality that all of the input image data are data indicating black in a case where the maximum value is smaller than the second threshold value.

17. The image processing apparatus as claimed in claim 15, wherein the detecting unit detects the abnormality that all of the input image data are data indicating black in a case where the minimum value is larger than the first threshold value, and detects the abnormality that all of the input image data are data indicating white in a case where the maximum value is smaller than the second threshold value.

18. The image processing apparatus as claimed in claim 15 further comprising a threshold value changing unit configured to set the first and the second threshold value to arbitrary values.

19. The image processing apparatus as claimed in claim 18, wherein the threshold value changing unit sets the first and second threshold values based on the gradation information of input image data containing no image.

20. The image processing apparatus as claimed in claim 18, wherein in a case where the minimum value stored in the minimum value storing unit is smaller than the first threshold value and the maximum value stored in the maximum value storing unit is larger than the second threshold value when a prescribed amount of the image data as measured from a head of the image data has been input, the threshold value changing unit sets the first threshold value to be smaller than the maximum value stored in the maximum value stored in the maximum value storing unit.

21. The image processing apparatus as claimed in claim 15, wherein the detecting section further comprises:
an amplitude determining unit configured: to compare a difference between the maximum value stored in the maximum value storing unit and the minimum value stored in the minimum value storing unit with an amplitude determining value in which to be used for determining whether a gradation difference of the image data is larger than a prescribed value; and to detect the abnormality by determining that the image data have no gradation difference in a case where the difference is smaller than the amplitude determination value; and
a mode switching unit configured to switch between a first determination mode in which the abnormality is detected by the detection of the detecting unit, and a second determination mode in which the abnormality is detected by the detection of the amplitude determining unit.

22. The image processing apparatus as claimed in claim 21 further comprising a scanning section configured to scan an original and generate the image data to be input to the input section.

23. The image processing apparatus as claimed in claim 22 further comprising:
a designating section configured to designate whether the original to be scanned by the scanning section is a photograph or not; and
a control section configured to control the mode switching unit to switch to the second determination mode in a case where the original is designated to be a photograph, and to control the mode switching unit to switch to the first determination mode in a case where the original is not designated to be a photograph.

24. The image processing apparatus as claimed in claim 23, wherein the scanning section comprises a CCD image sensor or a contact image sensor in which configured to perform the scanning of the original line by line in a main scanning direction while the original being transported in a direction perpendicular to the main scanning direction,
wherein the CCD image sensor or, the contact image sensor comprises a plurality of output channels, each of the channels provided for generating single-color, single-line data, and
wherein the detecting section detects the abnormality for each of the channels.

25. The image processing apparatus as claimed in claim 23, wherein the scanning unit comprises a CCD image sensor or a contact image sensor in which configured to perform the scanning of the original line by line in a main scanning direction while the original being transported in a direction perpendicular to the main scanning direction,
wherein the CCD image sensor or the contact image sensor is configured to scan the original for each of three primary colors of light, and
wherein the detecting section detects the abnormality for each of the three primary colors of light.

26. The image processing apparatus as claimed in claim 22 further comprising an image forming section configured to form an image on a recording medium based on the image data generated by the scanning section.

27. The image processing apparatus as claimed in claim 22 further comprising:
a data compressing section configured to compress the image data generated by the scanning section; and
a data sending section configured to send the image data compressed by the data compressing section to another apparatus via a communication line.

28. The image processing apparatus as claimed in claim 27 further comprising:
a data receiving section configured to receive a compressed image data from another apparatus via the communication line;
a data decompressing section configured to decompress the compressed image data received by the data receiving section; and
an image forming section configured to form an image on a recording medium based on the image data decompressed by the data decompressing section.

29. The image processing apparatus as claimed in claim 14, wherein the detecting section further comprises an amplitude determining unit configured:
to compare a difference between the maximum value stored in the maximum value storing unit and the minimum value stored in the minimum value storing unit with an amplitude determining value in which to be used for determining whether a gradation difference of the image data is larger than a prescribed value; and
to detect the abnormality by determining that the image data have no gradation difference in a case where the difference is smaller than the amplitude determination value.

30. The image processing apparatus as claimed in claim 1 further comprising a scanning section configured to scan an original and generate the image data to be input to the input section.

31. The image processing apparatus as claimed in claim 30, wherein the scanning section comprises a CCD image sensor or a contact image sensor in which configured to perform the scanning of the original line by line in a main scanning direction while the original being transported in a direction perpendicular to the main scanning direction,
wherein the CCD image sensor or the contact image sensor comprises a plurality of output channels, each of the channels provided for generating single-color, single-line data, and
wherein the detecting section detects the abnormality for each of the channels.

32. The image processing apparatus as claimed in claim 30, wherein the scanning unit comprises a CCD image sensor or a contact image sensor in which configured to perform the scanning of the original line by line in a main scanning direction while the original being transported in a direction perpendicular to the main scanning direction,
wherein the CCD image sensor or the contact image sensor is configured to scan the original for each of three primary colors of light, and
wherein the detecting section detects the abnormality for each of the three primary colors of light.

33. The image processing apparatus as claimed in claim 30 further comprising an image forming section configured to form an image on a recording medium based on the image data generated by the scanning section.

34. The image processing apparatus as claimed in claim 30 further comprising:
a data compressing section configured to compress the image data generated by the scanning section; and
a data sending section configured to send the image data compressed by the data compressing section to another apparatus via a communication line.

35. The image processing apparatus as claimed in claim 34 further comprising:
a data receiving section configured to receive a compressed image data from another apparatus via the communication line;
a data decompressing section configured to decompress the compressed image data received by the data receiving section; and
an image forming section configured to form an image on a recording medium based on the image data decompressed by the data decompressing section.

* * * * *